(12) United States Patent
Volkerink et al.

(10) Patent No.: US 12,389,199 B2
(45) Date of Patent: Aug. 12, 2025

(54) USING CELL TOWERS FOR LOCATIONING OF ASSETS

(71) Applicant: Trackonomy Systems, Inc., San Jose, CA (US)

(72) Inventors: Hendrik J. Volkerink, Palo Alto, CA (US); Ajay Khoche, West San Jose, CA (US)

( * ) Notice: Subject to any disclaimer, the term of this patent is extended or adjusted under 35 U.S.C. 154(b) by 527 days.

(21) Appl. No.: 17/659,443

(22) Filed: Apr. 15, 2022

(65) Prior Publication Data

US 2022/0256310 A1 Aug. 11, 2022

Related U.S. Application Data

(63) Continuation-in-part of application No. 17/592,347, filed on Feb. 3, 2022, and a continuation-in-part of application No. 17/558,234, filed on Dec. 21, 2021, now Pat. No. 12,219,429, and a continuation-in-part of application No. 17/449,862, filed on Oct. 4, 2021, now Pat. No. 11,916,651, which is a
(Continued)

(51) Int. Cl.
*H04W 4/029* (2018.01)
*H04W 4/024* (2018.01)
*H04W 64/00* (2009.01)

(52) U.S. Cl.
CPC ........... *H04W 4/029* (2018.02); *H04W 4/024* (2018.02); *H04W 64/003* (2013.01)

(58) Field of Classification Search
CPC ... H04W 4/029; H04W 4/024; H04W 64/003; H04W 64/00
See application file for complete search history.

(56) References Cited

U.S. PATENT DOCUMENTS

| 11,115,732 B2 | 9/2021 | Lucrecio et al. |
| 2011/0086609 A1 | 4/2011 | Buehler et al. |

(Continued)

FOREIGN PATENT DOCUMENTS

| AU | 2018204317 A1 | 1/2019 |
| AU | 2018250358 A1 | 5/2019 |

(Continued)

OTHER PUBLICATIONS

International Patent Application No. PCTUS22/25110 International Search Report and Written Opinion dated Aug. 16, 2022, 12 pages.
(Continued)

*Primary Examiner* — Nader Bolourchi

(57) ABSTRACT

A wireless tracking device may receive, from a server of a wireless tracking system, a cell tower data set having an entry with a cell tower identifier and cell tower location coordinates for each of at least one cell tower located along at least part of an expected route of an asset associated with the wireless tracking device. At intervals, the wireless tracking device activates a cellular communication circuit to receive at least one wireless signal including a broadcast cell tower identifier. The wireless tracking device retrieves cell tower location coordinates from an entry of the cell tower data set where the cell tower identifier matches the broadcast cell tower identifier. The wireless tracking device determines a location estimate of the wireless tracking device based on the retrieved cell tower coordinates.

25 Claims, 23 Drawing Sheets

Related U.S. Application Data continuation-in-part of application No. 16/923,060, filed on Jul. 7, 2020, now Pat. No. 11,580,826.

(60) Provisional application No. 63/235,916, filed on Aug. 23, 2021, provisional application No. 63/175,511, filed on Apr. 15, 2021, provisional application No. 63/145,472, filed on Feb. 3, 2021, provisional application No. 63/128,777, filed on Dec. 21, 2020, provisional application No. 62/871,685, filed on Jul. 8, 2019.

(56) References Cited

U.S. PATENT DOCUMENTS

| | | |
|---|---|---|
| 2012/0302284 A1 | 11/2012 | Rishy-Maharaj et al. |
| 2014/0141795 A1 | 5/2014 | Abraham et al. |
| 2016/0260059 A1 | 9/2016 | Benjamin et al. |
| 2017/0041949 A1 | 2/2017 | Ngo et al. |
| 2017/0164318 A1 | 6/2017 | Smith |
| 2018/0165568 A1 | 6/2018 | Khoche |
| 2018/0341911 A1 | 11/2018 | Daoura et al. |
| 2018/0349845 A1 | 12/2018 | Klein |
| 2018/0365635 A1* | 12/2018 | Lucrecio .................. G07C 5/00 |
| 2019/0037362 A1 | 1/2019 | Nogueira-Nine |
| 2019/0037418 A1 | 1/2019 | Gunasekara et al. |
| 2019/0113632 A1* | 4/2019 | Lucrecio ............... G01S 5/0036 |
| 2019/0235092 A1 | 8/2019 | Bastian et al. |
| 2019/0272458 A1 | 9/2019 | Khoche |
| 2019/0380007 A1 | 12/2019 | Mahmoud et al. |
| 2020/0092683 A1* | 3/2020 | Fyfe ...................... H04L 67/125 |
| 2020/0128482 A1 | 4/2020 | Daoura et al. |

FOREIGN PATENT DOCUMENTS

| | | |
|---|---|---|
| CA | 3061878 A1 | 11/2018 |
| CA | 3008512 A1 | 12/2018 |

OTHER PUBLICATIONS

International Patent Application No. PCTUS2021/064687 International Search Report and Written Opinion dated Apr. 21, 2022, 12 pages.

International Patent Application No. PCTUS2022/015125 International Search Report and Written Opinion dated May 4, 2022, 15 pages.

* cited by examiner

USING CELL TOWERS FOR LOCATIONING OF ASSETS

RELATED APPLICATIONS

This application is a continuation-in-part of U.S. patent application Ser. No. 17/592,347, titled "Method for Remote Interaction of Assets with Cellular Device and System Thereof," filed Feb. 3, 2022, which claims priority to U.S. patent application No. 63/145,472, titled "Method for Remote Interaction of Assets with Cellular Device and System Thereof," filed Feb. 3, 2021. This application is also a continuation-in-part of U.S. patent application Ser. No. 17/558,234, titled "Using Wireless Networks for Locationing and Data Transfer," filed Dec. 21, 2021, which claims priority to U.S. patent application No. 63/128,777, titled "Using Wireless Networks for Locationing and Data Transfer," filed Dec. 21, 2020, and to U.S. Patent Application No. 63/235,916, filed Aug. 23, 2021, This application is also a continuation-in-part of U.S. patent application Ser. No. 17/449,862, titled "Managing Satellite Communications in Flexible Form Factors," filed Oct. 4, 2021, which is a continuation-in-part of U.S. patent application Ser. No. 16/923,060, titled "Line-Powered Wireless Communications Systems," filed Jul. 7, 2020 which claims priority to U.S. Patent Application Ser. No. 62/871,685, filed Jul. 8, 2019, and this application claims priority to U.S. Patent Application Ser. No. 63/087,223, titled "Managing Satellite Communications in Flexible Form Factors," filed Oct. 4, 2020, and to U.S. Patent Application No. 63/087,226, titled "Download/Upload Of Satellite Data Files Through Gateway Nodes," filed Oct. 4, 2020. This application claims priority to U.S. Patent Application No. 63/175,511, titled "Using Cell Towers for Locationing of Assets", filed Apr. 15, 2021. Each of the above references applications is incorporated herein by reference in its entirety.

BACKGROUND

When assets are being transported between locations, electronic devices may be associated with the assets for tracking or other management purposes. Tracking devices are often required to communicate frequent updates, store large amounts of data describing destination and trajectory of the assets, and perform numerous other functions during transportation of the assets. Often, tracking devices must balance use of computational resources and onboard sensors with maintaining battery life, and are unable to accurately record, track, upload, and download GPS data without consuming battery life.

SUMMARY

Disclosed herein is a method for leveraging cell towers to perform locationing for assets by wireless tracking devices and a system thereof. Wireless tracking devices are configured to detect cell towers during transportation, with or without active cellular data plans. At a minimum, responsive to detecting a cell tower, wireless tracking devices may receive an identifier of the detected cell tower and may determine a signal strength corresponding to a communication between the cell tower and the wireless tracking device. Identifiers of cell towers may be used to determine GPS coordinates or other location data corresponding to the cell tower. Based at least in part on the determined signal strengths and GPS coordinates corresponding to one or more detected cell towers, wireless tracking devices and/or other entities of wireless tracking systems may determine current locations of the wireless tracking devices.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DETAILED DESCRIPTION OF THE EMBODIMENTS

Figure 1:
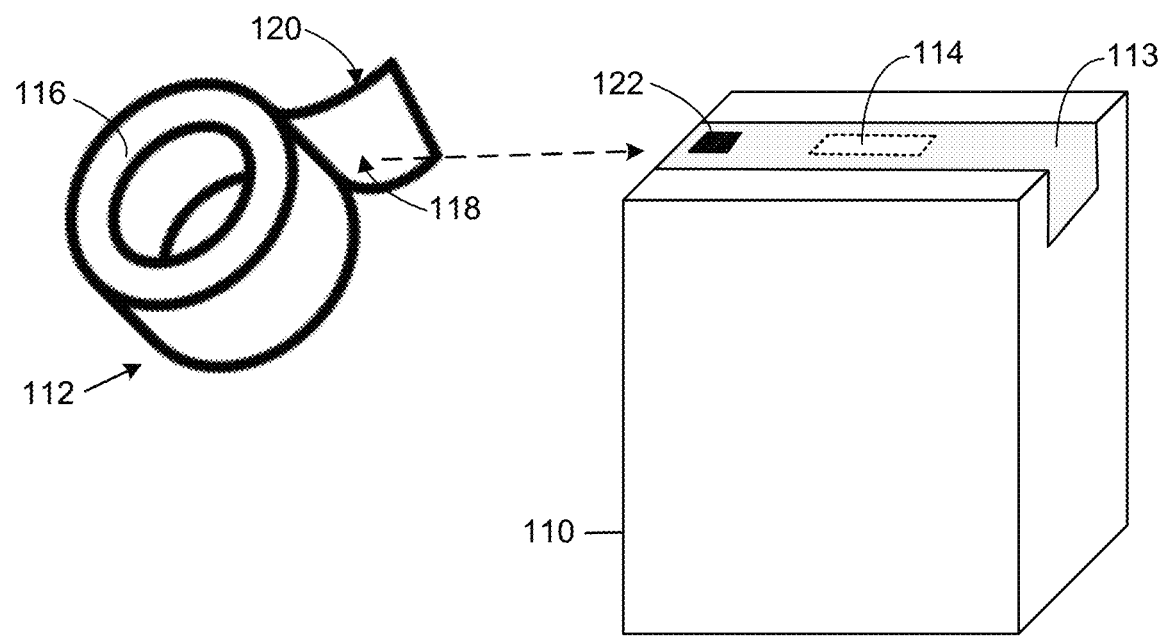
FIG. 1 is a schematic illustrating one example adhesive tape-agent platform used to seal a package for shipment, in embodiments.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 6A-C and/or 10A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

Further, each of the "agents", "nodes", "tape nodes", and "tape agents" may include flexible or non-flexible form factors unless otherwise specified. Thus, each of the "agents", "nodes", "tape nodes", and "tape agents" include flexible and non-flexible (rigid) form factors, or a combination thereof including flexible components and non-flexible components.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof. The term "processor" or "computer" or the like includes one or more of: a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC), a memory controller, bus controller, and other components that manage data flow between said processor associated memory, and other components communicably coupled to the system bus. Thus the terms "module," "manager," "component", and "unit" may include computer readable instructions that, when executed by a processor, implement the functionality discussed herein with respect to said "module," "manager," "component", and "unit".

Adhesive Tape Agent Platform

FIG. 1 is a schematic illustrating one example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
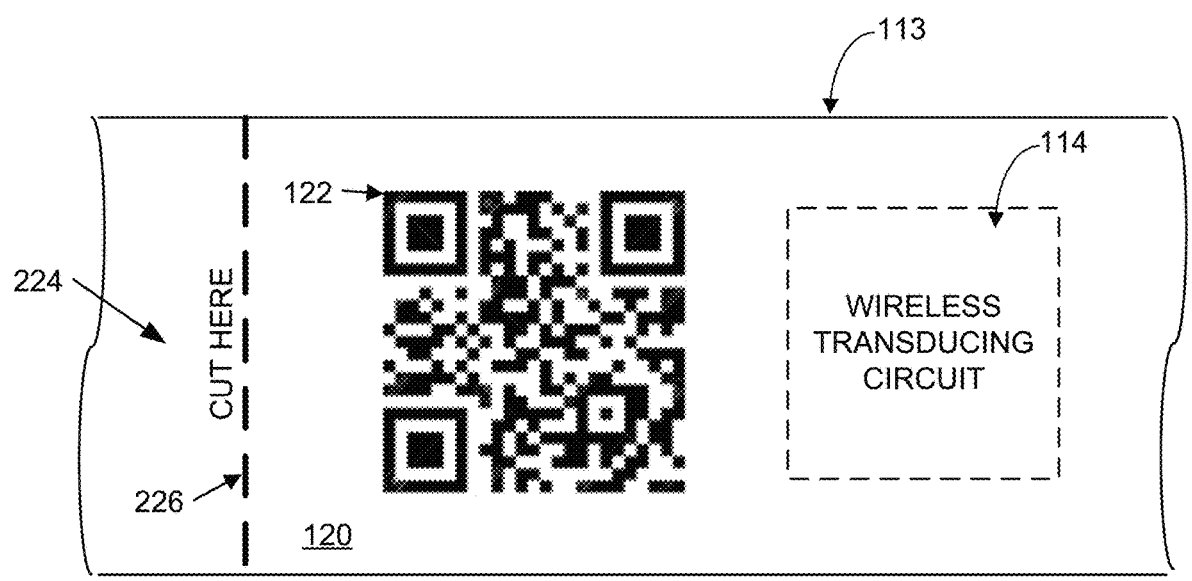
FIG. 2 is a schematic illustrating a non-adhesive surface of a segment of the adhesive tape agent platform of FIG. 1, in embodiments.

FIG. 2 is a schematic illustrating a non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example of FIG. 2, the segment 113 of the adhesive tape agent platform 112 includes an identifier 122 (e.g., a two-dimensional bar code, such as a QR Code), written instructions 224 (e.g., "Cut Here"), and an associated cut line 226 that indicates where the user should cut the adhesive tape agent platform 112. The written instructions 224 and the cut line 226 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 226 may demarcate the boundaries between adjacent segments at locations that are free of any active components of the wireless transducing circuit 114. The spacing between the wireless transducing circuit 114 and the cut lines 226 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 226. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 226).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
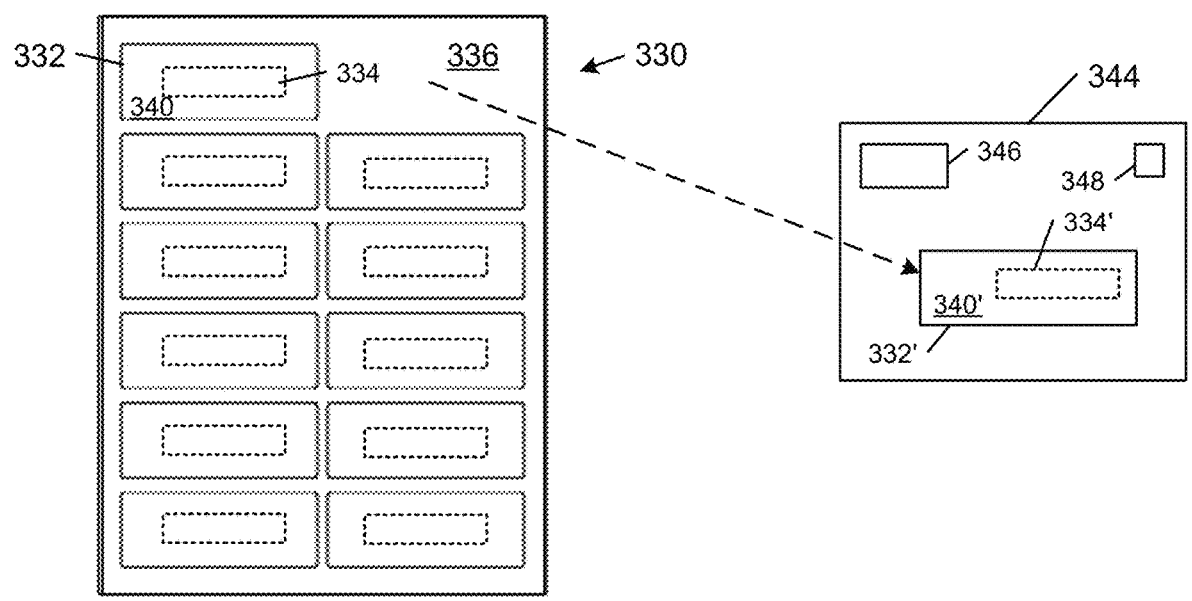
FIG. 3 shows one example adhesive tape platform that includes a set of adhesive tape platform segments on a backing sheet, in embodiments.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Adhesive tape platform 330 may represent adhesive tape platform 112 of FIG. 1. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 44 also includes a return address 346 and, optionally, a postage stamp or mark 348.

In some examples, segments of the adhesive tape platform 330 are deployed by a human operator. The human operator may be equipped with a mobile phone or other device that allows the operator to authenticate and initialize the adhesive tape platform 330. In addition, the operator can take a picture of a parcel including the adhesive tape platform and any barcodes associated with the parcel and, thereby, create a persistent record that links the adhesive tape platform 330 to the parcel. In addition, the human operator typically will send the picture to a network service and/or transmit the picture to the adhesive tape platform 330 for storage in a memory component of the adhesive tape platform 330.

In some examples, the wireless transducing circuit components 334 that are embedded in a segment 332 of the adhesive tape platform 330 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
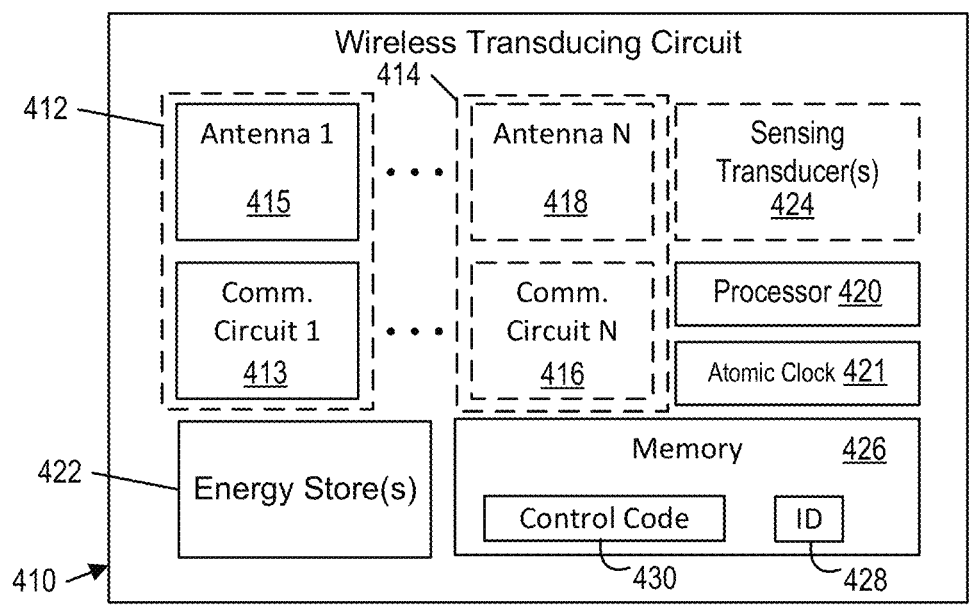
FIG. 4 is a block diagram illustrating components of an example wireless transducing circuit that includes one or more wireless communication modules, in embodiments.

FIG. 4 shows a block diagram of the components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 4. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
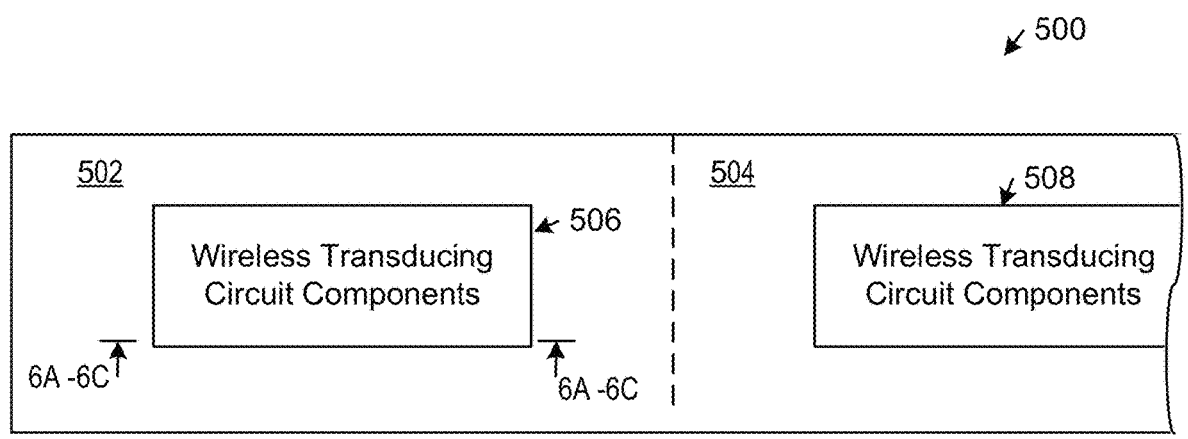
FIG. 5 is a top view of a portion of an example flexible adhesive tape platform illustrating a first segment and a portion of a second segment, in embodiments.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 500 according to a roll-to-roll fabrication process is described in connection with FIGS. 6A-6C and as shown in FIGS. 7A and 7B of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 6A:
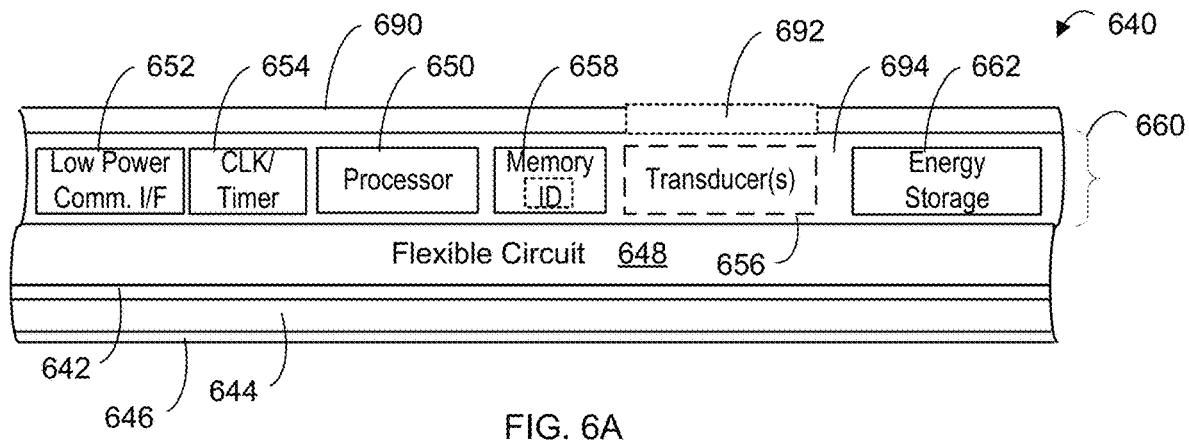
FIGS. 6A-C are schematic diagrams illustrating cross-sectional side views of portions of example segments of three types of flexible adhesive tape agent platforms, in embodiments.

FIG. 6A is a schematic illustrating a cross-sectional side view of a portion of an example segment 640 of a flexible adhesive tape agent platform (e.g., platform 500 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a prefabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

Figure 6B:
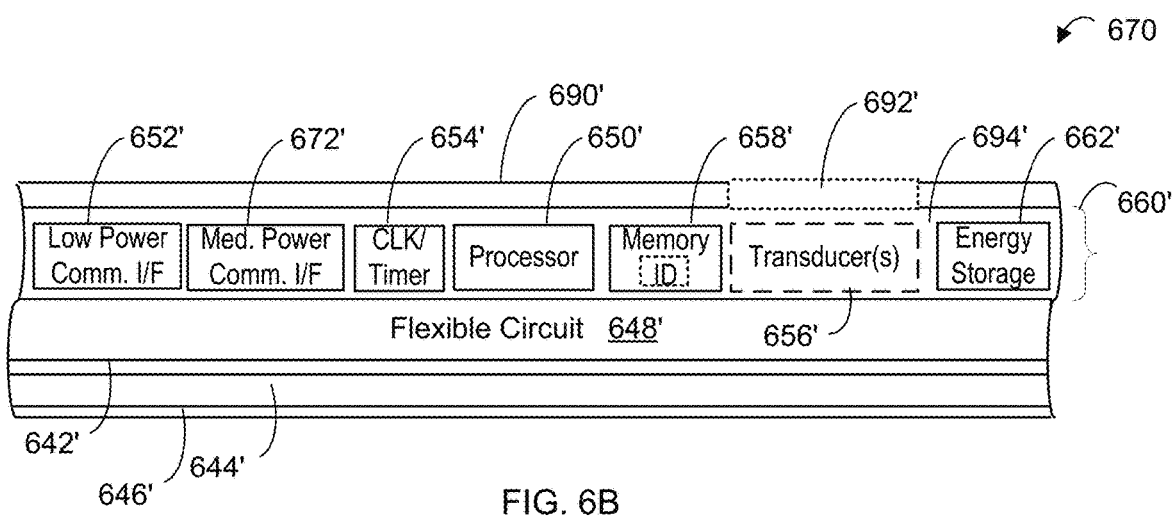

FIG. 6B shows a cross-sectional side-view of a portion of an example segment 670 of a flexible adhesive tape agent platform (e.g., platform 500 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652.

The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

Figure 6C:
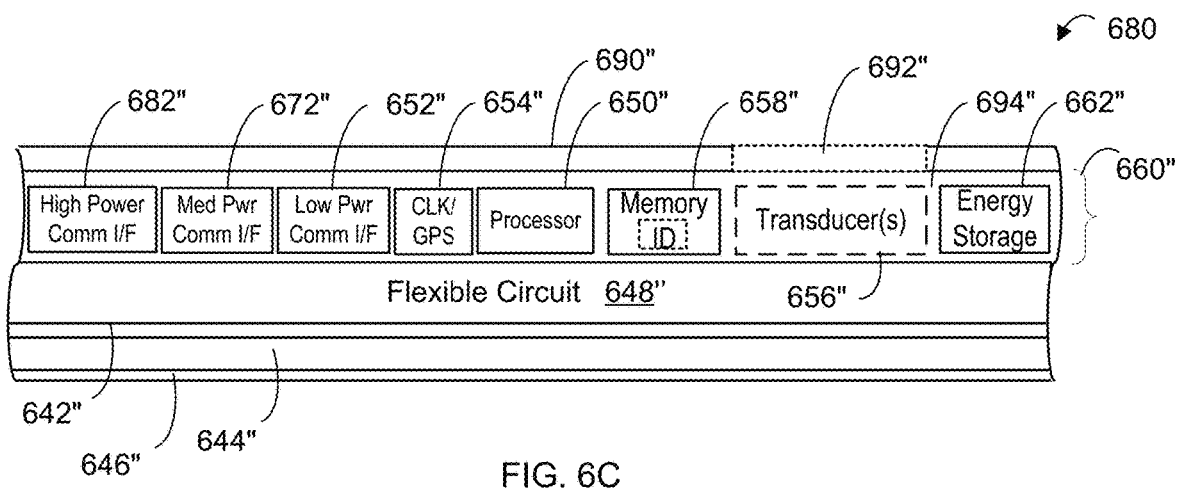

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652", and may include a medium-power communications-interface 672". The high-power communications-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648".

The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Figure 7:
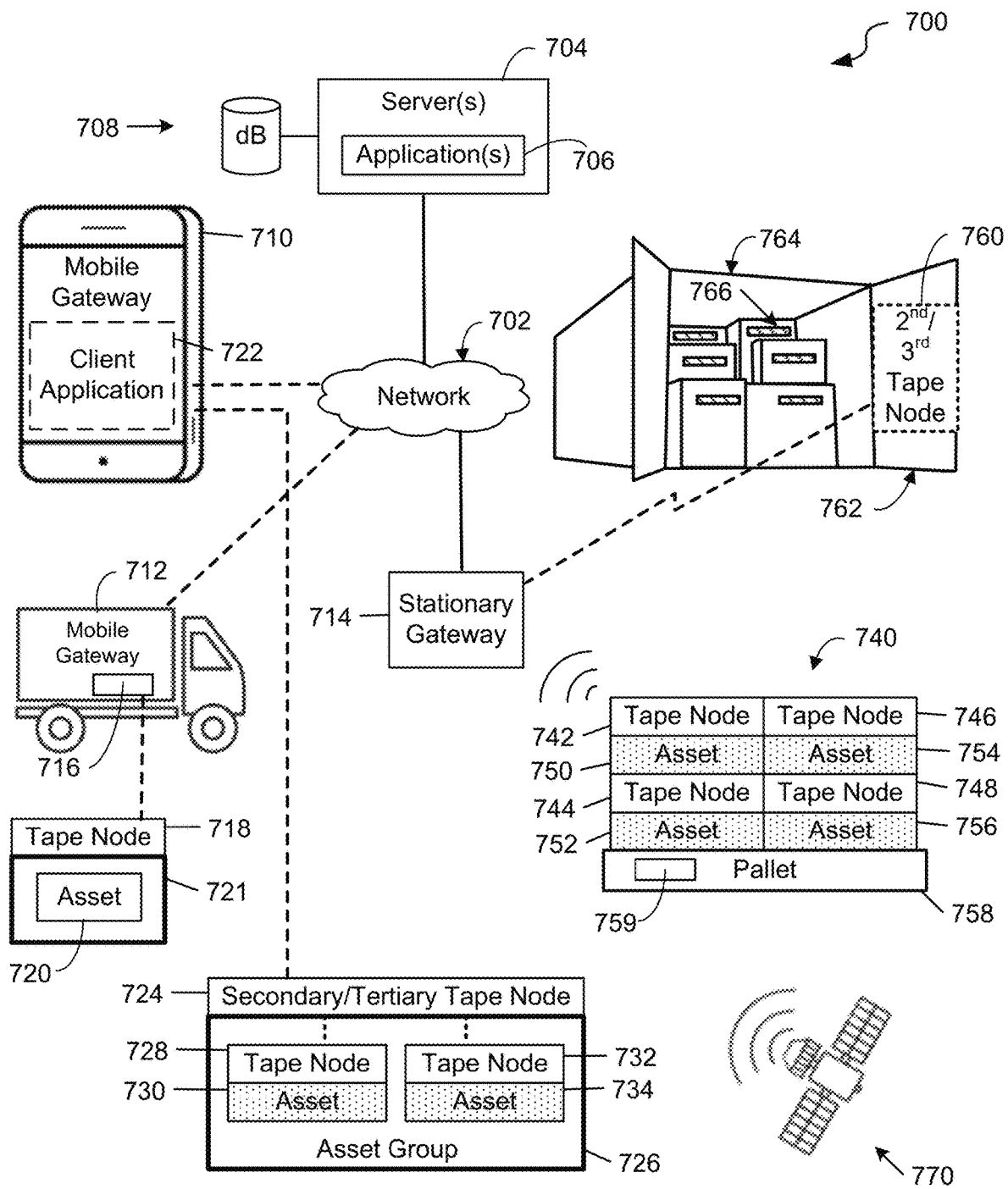
FIG. 7 is a schematic illustrating an example network communications environment that includes a network supporting communications between servers, mobile gateways, a stationary gateway, and various types of tape nodes associated with various assets, in embodiments.

FIG. 7 shows an example network communications environment 700 that includes a network 702 that supports communications between one or more servers 704 executing one or more applications of a network service 708, mobile gateways 710 (a smart device mobile gateway), 712 (a vehicle mobile gateway), a stationary gateway 714, and various types of tape nodes that are associated with various assets (e.g., parcels, equipment, tools, persons, and other things). Hereinafter "tape nodes" may be used interchangeably with the "agents", as described above, with reference to FIGS. 1-6; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 702 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 702 includes communications infrastructure equipment, such as a geolocation satellite system 770 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and Zig-Bee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 720) or other stationary (e.g., stationary gateway 714) or mobile object (e.g., a, such as a delivery truck, such as mobile gateway 712) or stationary object (e.g., a structural element of a building). This process activates the tape node (e.g., the tape node 718) and causes the tape node 718 to communicate with the one or more servers 704 of the network service 708. In this process, the tape node 418 may communicate through one or more other tape nodes (e.g., the tape nodes 742, 744, 746, 748) in the communication hierarchy. In this process, the one or more servers 704 executes the network service application 706 to programmatically configure tape nodes 718, 724, 728, 732, 742, 744, 746, 748, that are deployed in the network communications environment 700. In some examples, there are multiple classes or types of tape nodes (e.g., the master agent, secondary agent, or tertiary agent as discussed herein), where each tape node class has a different respective set of functionalities and/or capacities, as described herein with respect to the "agents" in FIGS. 1-6C. For example, the master agents have a lower-power wireless communication interface (e.g., the low-power wireless-communication interface 652, 652', 652", with reference to FIGS. 6A-6C), in comparison to the secondary and tertiary agents.

In some examples, the one or more servers 704 communicate over the network 702 with one or more gateways 710, 712, 714 that are configured to send, transmit, forward, or relay messages to the network 702 in response to transmissions from the tape nodes 718, 724, 728, 732, 742, 744, 746, 748 that are associated with respective assets and within communication range. Example gateways include mobile gateways 710, 712 and a stationary gateway 714. In some examples, the mobile gateways 710, 712, and the stationary gateway 714 are able to communicate with the network 702 and with designated sets or groups of tape nodes.

In some examples, the mobile gateway 712 is a vehicle (e.g., a delivery truck or other mobile hub) that includes a wireless communications unit 716 that is configured by the network service 708 to communicate with a designated network of tape nodes, including tape node 718 (e.g., a master tape node) in the form of a label that is adhered to a parcel 721 (e.g., an envelope) that contains an asset 720, and is further configured to communicate with the network service 708 over the network 702. In some examples, the tape node 718 includes a lower-power wireless-communications interface of the type used in, e.g., segment 640 (shown in FIG. 6A), and the wireless communications unit 716 may be implemented by a secondary or tertiary tape node (e.g., one of segment 670 or segment 680, respectively shown in FIGS. 6B and 6C) that includes a lower-power communications interfaces for communicating with tape nodes within range of the mobile gateway 712 and a higher-power communications-interface for communicating with the network 702. In this way, the tape node 718 and wireless communications unit 716 create a hierarchical wireless network of tape nodes for transmitting, forwarding, bridging, relaying, or otherwise communicating wireless messages to, between, or on behalf of the tape node 718 in a power-efficient and cost-effective way.

In some examples, a mobile gateway 710 is a mobile phone that is operated by a human operator and executes a client application 722 that is configured by a network service to communicate with a designated set of tape nodes, including a secondary or tertiary tape node 724 that is adhered to a parcel 726 (e.g., a box), and is further configured to communicate with a server 704 over the network 702. In the illustrated example, the parcel 726 contains a first parcel labeled or sealed by a master tape node 728 and containing a first asset 730, and a second parcel labeled or sealed by a master tape node 732 and containing a second asset 734. The secondary or tertiary tape node 724 communicates with each of the master tape nodes 728, 732 and also communicates with the mobile gateway 710. In some examples, each of the master tape nodes 728, 732 includes a lower-power wireless-communications interface of the type used in, e.g., segment 640 (shown in FIG. 6A), and the secondary/tertiary tape node 724 is implemented by a tape node (e.g., segment 670 or segment 680, shown in FIGS. 6B and 6C) that includes a low-power communications interface for communicating with the master tape nodes 728, 732 contained within the parcel 726, and a higher-power communications interface for communicating with the mobile gateway 710. The secondary or tertiary tape node 724 is operable to relay wireless communications between the master tape nodes 728, 732 contained within the parcel 726 and the mobile gateway 710, and the mobile gateway 710 is operable to relay wireless communications between the secondary or tertiary tape node 724 and the server 704 over the network 702. In this way, the master tape nodes 728 and 732 and the secondary or tertiary tape node 724 create a wireless network of nodes for transmitting, forwarding, relaying, or otherwise communicating wireless messages to, between, or on behalf of the master tape nodes 728, 732, the secondary or tertiary tape node 724, and the network service (not shown) in a power-efficient and cost-effective way.

In some embodiments, the client application 722 is installed on a mobile device (e.g., smartphone) that may also operate as mobile gateway 710. The client application 722 may cause the mobile device to function as a mobile gateway 710. For example, the client application 722 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 722) relays that data to the server 704 via cellular (2G, 3G, 4G, 5G) or Wi-Fi. Further, the client application 722 may cause the mobile device to establish a connection with, and receive pings (e.g., alerts to nearby assets that an environmental profile threshold has been exceeded), from the tape nodes or from the server 704. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 722 may share location data with the tape node, allowing the tape node to pinpoint its location.

In some examples, the stationary gateway 714 is implemented by a server 704 executing a network service application 706 that is configured by the network service 708 to communicate with a designated set 740 of master tape nodes 742, 744, 746, 748 that are adhered to respective parcels containing respective assets 750, 752, 754, 756 on a pallet 758. In other examples, the stationary gateway 714 is implemented by a secondary or tertiary tape node 760 (e.g., segments 670 or 680, respectively shown in FIGS. 6B and 6C) that is adhered to, for example, a wall, column or other infrastructure component of the physical premise's environment 700, and includes a low-power communications interface for communicating with nodes within range of the stationary gateway 714 and a higher-power communications interface for communicating with the network 702.

In one embodiment, each of the master tape nodes 742-748 is a master tape node and is configured by the network service 708 to communicate individually with the stationary gateway 714, which relays communications from the master tape nodes 742-748 to the network service 708 through the stationary gateway 714 and over the network 702. In another embodiment, one of the master tape nodes 742-748 at a time is configured to transmit, forward, relay, or otherwise communicate wireless messages to, between, or on behalf of the other master nodes on the pallet 758. In this embodiment, the master tape node may be determined by the master tape nodes 742-748 or designated by the network service 708. In some examples, the master tape nodes 742-748 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 759 is adhered to the pallet 758 and is configured to perform the role of a master node for the other master tape nodes 742-748. In these ways, the master tape nodes 742-748, 759 are configurable to create different wireless networks of nodes for transmitting, forwarding, relaying, bridging, or otherwise communicating wireless messages with the network service 408 through the stationary gateway 714 and over the network 702 in a power-efficient and cost-effective way.

In the illustrated example, the stationary gateway 714 also is configured by the network service 708 to communicate with a designated network of tape nodes, including the secondary or tertiary tape node 760 that is adhered to the inside of a door 762 of a shipping container 764, and is further configured to communicate with the network service 708 over the network 702. In the illustrated example, the shipping container 764 contains a number of parcels labeled or sealed by respective master tape nodes 766 and containing respective assets. The secondary or tertiary tape node 760 communicates with each of the master tape nodes 766 within the shipping container 764 and communicates with the stationary gateway 714. In some examples, each of the master tape nodes 766 includes a low-power wireless communications-interface (e.g., the low-power wireless-communication interface 652, with reference to FIG. 6A), and the secondary or tertiary tape node 760 includes a low-power wireless-communications interface (low-power wireless-communication interfaces 652', 652", with reference to FIGS. 6B-6C) for communicating with the master tape nodes 766 contained within the shipping container 764, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 714. In some examples, either a secondary or tertiary tape node, or both, may be used, depending on whether a high-power wireless-communication interface is necessary for sufficient communication.

In some examples, when the doors of the shipping container 764 are closed, the secondary or tertiary tape node 760 is operable to communicate wirelessly with the master tape nodes 766 contained within the shipping container 764. In some embodiments, both a secondary and a tertiary node are attached to the shipping container 764. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 760 is configured to collect sensor data from master tape nodes 766 and, in some embodiments, process the collected data to generate, for example, statistics from the collected data. When the doors of the shipping container 764 are open, the secondary or tertiary tape node 760 is programmed to detect the door opening (e.g., using a photodetector or an accelerometer component of the secondary or tertiary tape node 760) and, in addition to reporting the door opening event to the network service 708, the secondary or tertiary tape node 760 is further programmed to transmit the collected data and/or the processed data in one or more wireless messages to the stationary gateway 714. The stationary gateway 714, in turn, is operable to transmit the wireless messages received from the secondary or tertiary tape node 760 to the network service 708 over the network 702. Alternatively, in some examples, the stationary gateway 714 also is operable to perform operations on the data received from the secondary or tertiary tape node 760 with the same type of data produced by the secondary or tertiary tape node 760 based on sensor data collected from the master tape nodes 742-748. In this way, the secondary or tertiary tape node 760 and master tape node 766 create a wireless network of nodes for transmitting, forwarding, relaying, or otherwise communicating wireless messages to, between, or on behalf of the master tape node 766, the secondary or tertiary tape nodes 760, and the network service 708 in a power-efficient and cost-effective way.

In an example of the embodiment shown in FIG. 7, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-6C). The short-range master tape nodes typically are adhered directly to parcels containing assets. In the illustrated example, the master tape nodes 718, 728, 732, 742-748, 766 are short-range tape nodes. The short-range tape nodes typically communicate with a low-power wireless-communication protocol (e.g., Bluetooth LE, Zigbee, or Z-wave). The segments 670 are typically adhered to objects (e.g., a parcel 726 and a shipping container 764) that are associated with multiple parcels that are separated from the medium-range tape nodes by a barrier or a long distance. In the illustrated example, the secondary and/or tertiary tape nodes 724 and 760 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 700.

In the illustrated example, the mobile gateway 712 and the stationary gateway 714 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 712 (e.g., a truck). In these examples, the wireless communications unit 716 may be moved to different locations in the network communications environment 700 to assist in connecting other tape nodes to the wireless communications unit 716. In some examples, the stationary gateway 714 is a tape node that may be attached to a stationary structure (e.g., a wall) in the network communications environment 700 with a known geographic location (e.g., GPS coordinates). In these examples, other tape nodes in the environment may determine their geographic location by querying the stationary gateway 714.

In some examples, in order to conserve power, the tape nodes typically communicate according to a schedule promulgated by the network service 708. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 704, either directly or indirectly through a gateway tape node (e.g., the long-range tape node, such as wireless communication unit 716, adhered to the mobile gateway 712, or a long-range tape node, such as stationary gateway 714, that is adhered to an infrastructure component of the network communications environment 700). In other examples, the master tape node processes the information contained in the received data packets and transmits the processed information to the server 704.

Figure 8:
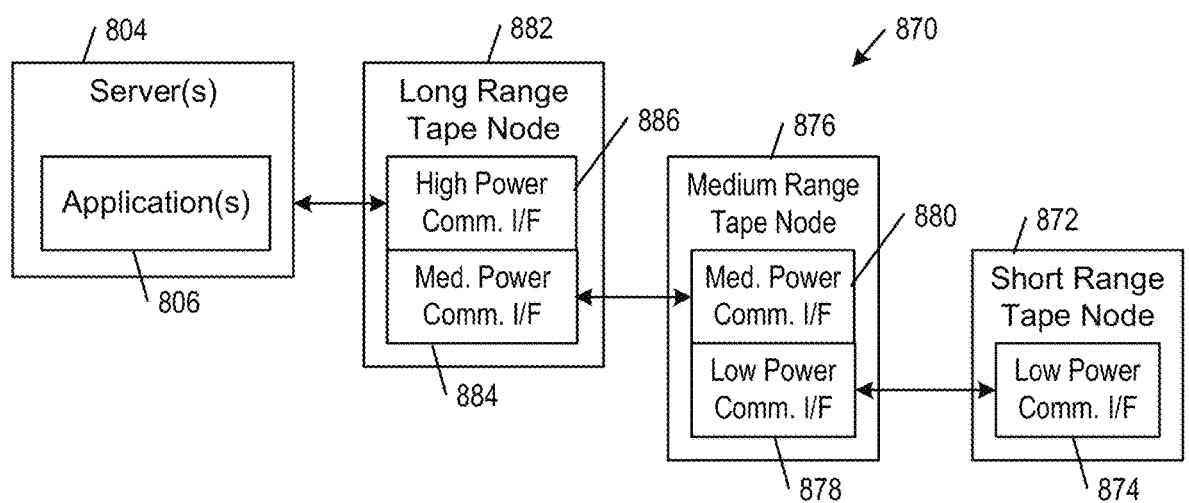
FIG. 8 is a schematic illustrating one example hierarchical wireless communications network of tape nodes, in embodiments.

FIG. 8 is a schematic illustrating one example hierarchical wireless communications network of tape nodes 870. In this example, the short-range tape node 872 and the medium range tape node 876 communicate with one another over their respective low power wireless communication interfaces 874, 878. The medium range tape node 876 and the long-range tape node 882 communicate with one another over their respective medium power wireless communication interfaces 880, 884. The long-range tape node 882 and the one or more network service servers 804 (e.g., server(s) 704, FIG. 7) running application(s) 806 (e.g., application(s) 706) communicate with one another over the high-power communication interface 886. In some examples, the low power communication interfaces 874, 878 establish wireless communications with one another in accordance with the Bluetooth LE protocol, the medium power communication interfaces 880, 884 establish wireless communications with one another in accordance with the LoRa communications protocol, and the high-power communication interface 886 establishes wireless communications with the one or more network service servers 804 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 804 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 804. The schedule usually dictates all aspects of the communication, including the times when particular tape nodes should communicate, the mode of communication, and the contents of the communication. In one example, the one or more network service servers 804 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 804, either directly or indirectly through a gateway tape node (e.g., the long-range wireless communication unit 716 adhered to the mobile gateway 712 (which could be a vehicle, ship, plane, etc.) or the stationary gateway 714 is a long-range tape node adhered to an infrastructure component of the environment 700). In other examples, the master tape node processes the information contained in the received data packets and transmits the processed information to the one or more network service servers 804/704.

Figure 9:
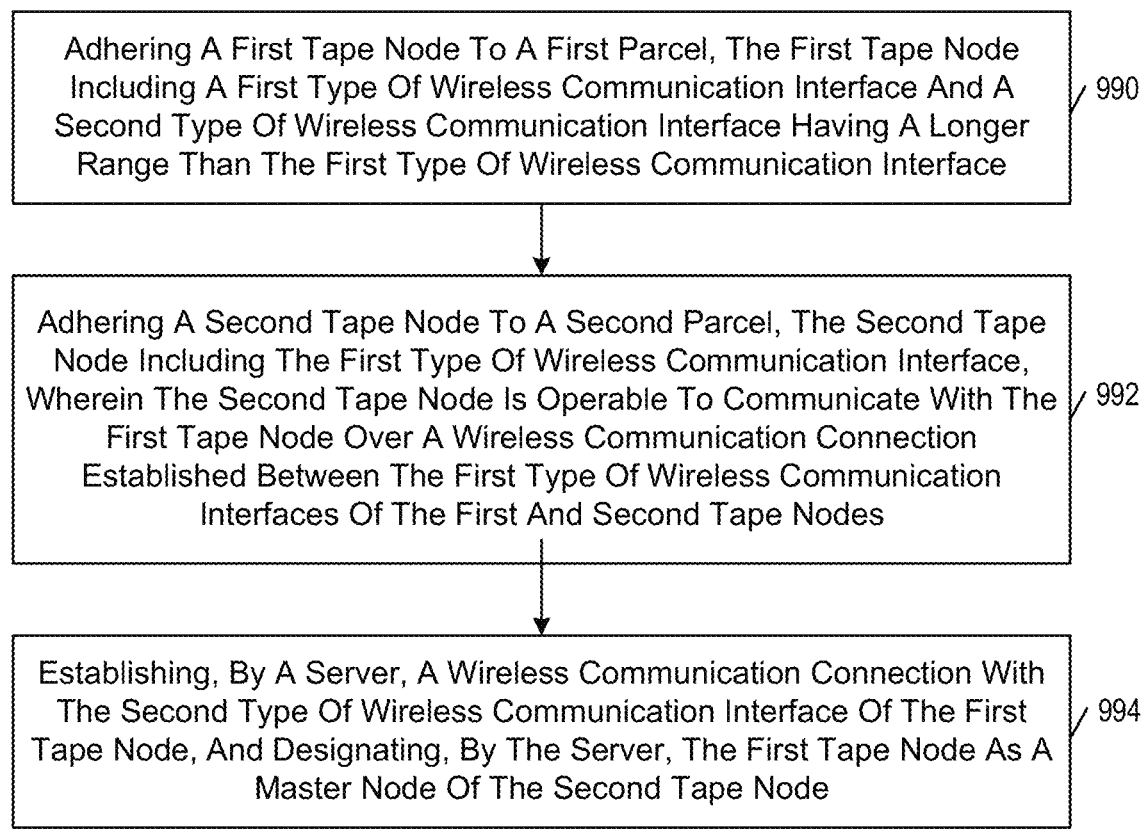
FIG. 9 is a flowchart illustrating one example method of creating a hierarchical communications network, in embodiments.

FIG. 9 is a flowchart illustrating one example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 9, block 990). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 9, block 992). An application executing on a computer system (e.g., the one or more network service servers 804 of a network service 808) establishes a wireless communication connection with the second type of wireless communication interface of the first tape node, and the application transmits programmatic code executable by the first tape node to function as a master tape node with respect to the second tape node (FIG. 9, block 994).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 10A:
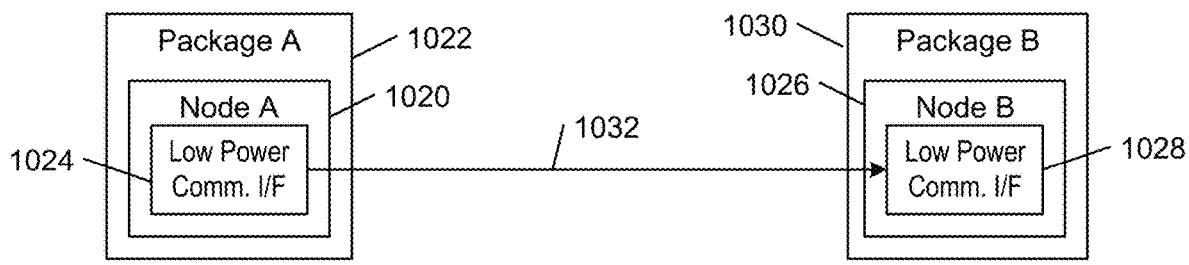
FIG. 10A shows a node (Node A) associated with a package (Package A), in embodiments.

Referring to FIG. 10A, a node 1020 (Node A) is associated with a package 1022 (Package A). In some embodiments, the node 1020 may be implemented as a tape node that is used to seal the package 1022 or it may be implemented as a label node that is used to label the package 1022; alternatively, the node 1020 may be implemented as a non-tape node that is inserted within the package 1022 or embedded in or otherwise attached to the interior or exterior of the package 1022. In the illustrated embodiment, the node 1020 includes a low power communications interface 1024 (e.g., a Bluetooth Low Energy communications interface). Another node 1026 (Node B), which is associated with another package 1030 (Package B), is similarly equipped with a compatible low power communications interface 1028 (e.g., a Bluetooth Low Energy communications interface).

In an example scenario, in accordance with the programmatic code stored in its memory, node 1026 (Node B) requires a connection to node 1020 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1020 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1032 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
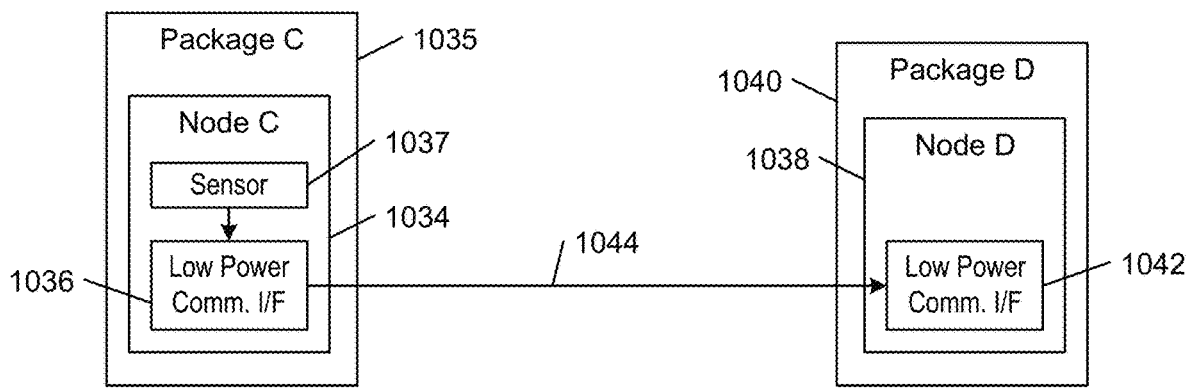
FIG. 10B shows a node (Node C) associated with a package (Package C), in embodiments.

Referring to FIG. 10B, a node 1034 (Node C) is associated with a package 1035 (Package C). In the illustrated embodiment, the Node C includes a low power communications interface 1036 (e.g., a Bluetooth Low Energy communications interface), and a sensor 1037 (e.g., a temperature sensor). Another node 1038 (Node D), which is associated with another package 1040 (Package D), is similarly equipped with a compatible low power communications interface 1042 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1044 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
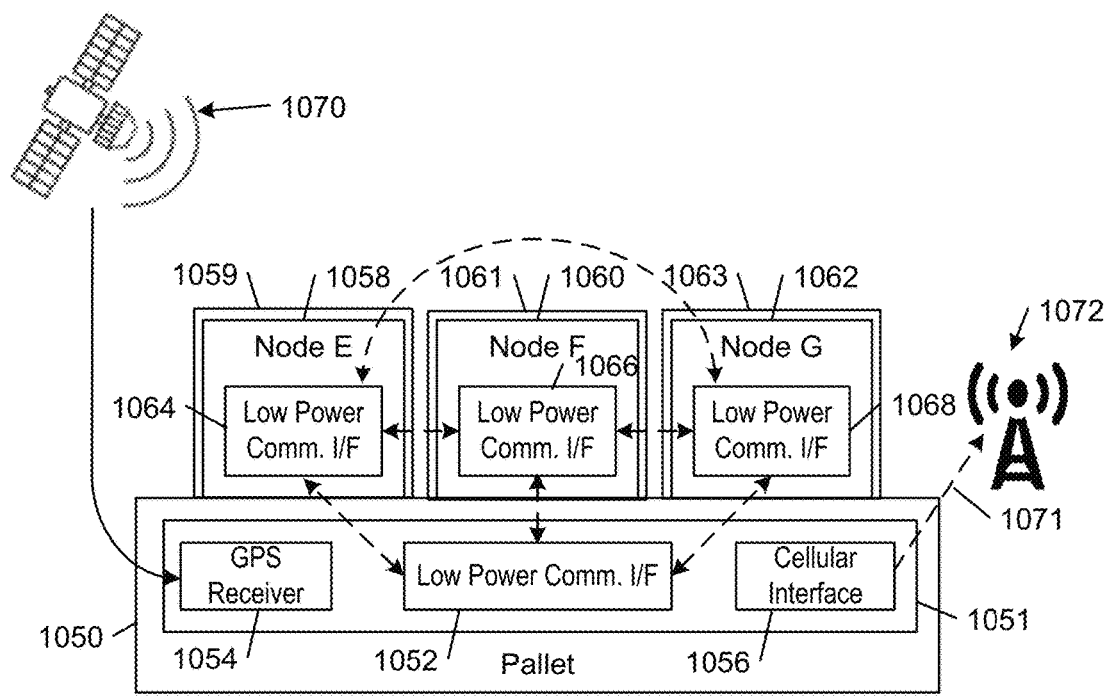
FIG. 10C shows a pallet associated with a master node that includes a low-power communications interface, a GPS receiver, and a cellular communications interface, in embodiments.

Referring to FIG. 10C, a pallet 1050 is associated with a master node 1051 that includes a low-power communications interface 1052, a GPS receiver 1054, and a cellular communications interface 1056. In some embodiments, the master node 1051 may be implemented as a tape node or a label node that is adhered to the pallet 1050. In other embodiments, the master node 1051 may be implemented as a non-tape node that is inserted within the body of the pallet 1050 or embedded in or otherwise attached to the interior or exterior of the pallet 1050.

The pallet 1050 provides a structure for grouping and containing packages 1059, 1061, 1063 each of which is associated with a respective peripheral node 1058, 1060, 1062 (Node E, Node F, and Node G). Each of the peripheral nodes 1058, 1060, 1062 includes a respective low power communications interface 1064, 1066, 1068 (e.g., Bluetooth Low Energy communications interface). In the illustrated embodiment, each of the nodes E, F, G, and the master node 1051 are connected to each of the other nodes over a respective low power communications path (shown by dashed lines).

In some embodiments, the packages 1059, 1061, 1063 are grouped together because they are related. For example, the packages 1059, 1061, 1063 may share the same shipping itinerary or a portion thereof. In an example scenario, the master pallet node 1051 scans for advertising packets that are broadcasted from the peripheral nodes 1058, 1060, 1062. In some examples, the peripheral nodes broadcast advertising packets during respective scheduled broadcast intervals. The master node 1051 can determine the presence of the packages 1059, 1061, 1063 in the vicinity of the pallet 1050 based on receipt of one or more advertising packets from each of the nodes E, F, and G. In some embodiments, in response to receipt of advertising packets broadcasted by the peripheral nodes 1058, 1060, 1062, the master node 1051 transmits respective requests to the server to associate the master node 1051 and the respective peripheral nodes 1058, 1060, 1062. In some examples, the master tape node requests authorization from the server to associate the master tape node and the peripheral tape nodes. If the corresponding packages 1059, 1061, 1063 are intended to be grouped together (e.g., they share the same itinerary or certain segments of the same itinerary), the server authorizes the master node 1051 to associate the peripheral nodes 1058, 1060, 1062 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1051 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1058, 1060, 1062 include environmental sensors for obtaining information regarding environmental conditions in the vicinity of the associated packages 1059, 1061, 1063. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1051 can determine its own location based on geolocation data transmitted by a satellite-based radio navigation system 1070 (e.g., GPS, GLONASS, and NAVSTAR) and received by the GPS receiver 1054 component of the master node 1051. In an alternative embodiment, the location of the master pallet node 1051 can be determined using cellular based navigation techniques that use mobile communication technologies (e.g., GSM, GPRS, CDMA, etc.) to implement one or more cell-based localization techniques. After the master node 1051 has ascertained its location, the distance of each of the packages 1059, 1061, 1063 from the master node 1051 can be estimated based on the average signal strength of the advertising packets that the master node 1051 receives from the respective peripheral node. The master node 1051 can then transmit its own location and the locations of the package nodes E, F, and G to a server over a cellular interface connection with a cellular network 1072. Other methods of determining the distance of each of the packages 1059, 1061, 1063 from the master node 1051, such as Received Signal-Strength Index (RSSI) based indoor localization techniques, also may be used.

In some embodiments, after determining its own location and the locations of the peripheral nodes, the master node 1051 reports the location data and the collected and optionally processed (e.g., either by the peripheral nodes peripheral nodes 1058, 1060, 1062 or the master node 1051) sensor data to a server over a cellular communication path 1071 on a cellular network 1072.

In some examples, nodes are able to autonomously detect logistics execution errors if packages that are supposed to travel together no longer travel together and raise an alert. For example, a node (e.g., the master node 1051 or one of the peripheral nodes 1058, 1060, 1062) alerts the server when the node determines that a particular package 1059 is being or has already been improperly separated from the group of packages. The node may determine that there has been an improper separation of the particular package 1059 in a variety of ways. For example, the associated peripheral node 1058 that is bound to the particular package 1059 may include an accelerometer that generates a signal in response to movement of the package from the pallet. In accordance with its intelligent agent program code, the associated peripheral node 1058 determines that the master node 1051 has not disassociated the particular package 1059 from the group and therefore broadcasts advertising packets to the master node, which causes the master node 1051 to monitor the average signal strength of the advertising packets and, if the master node 1051 determines that the signal strength is decreasing over time, the master node 1051 will issue an alert either locally (e.g., through a speaker component of the master node 1051) or to the server.

Figure 11:
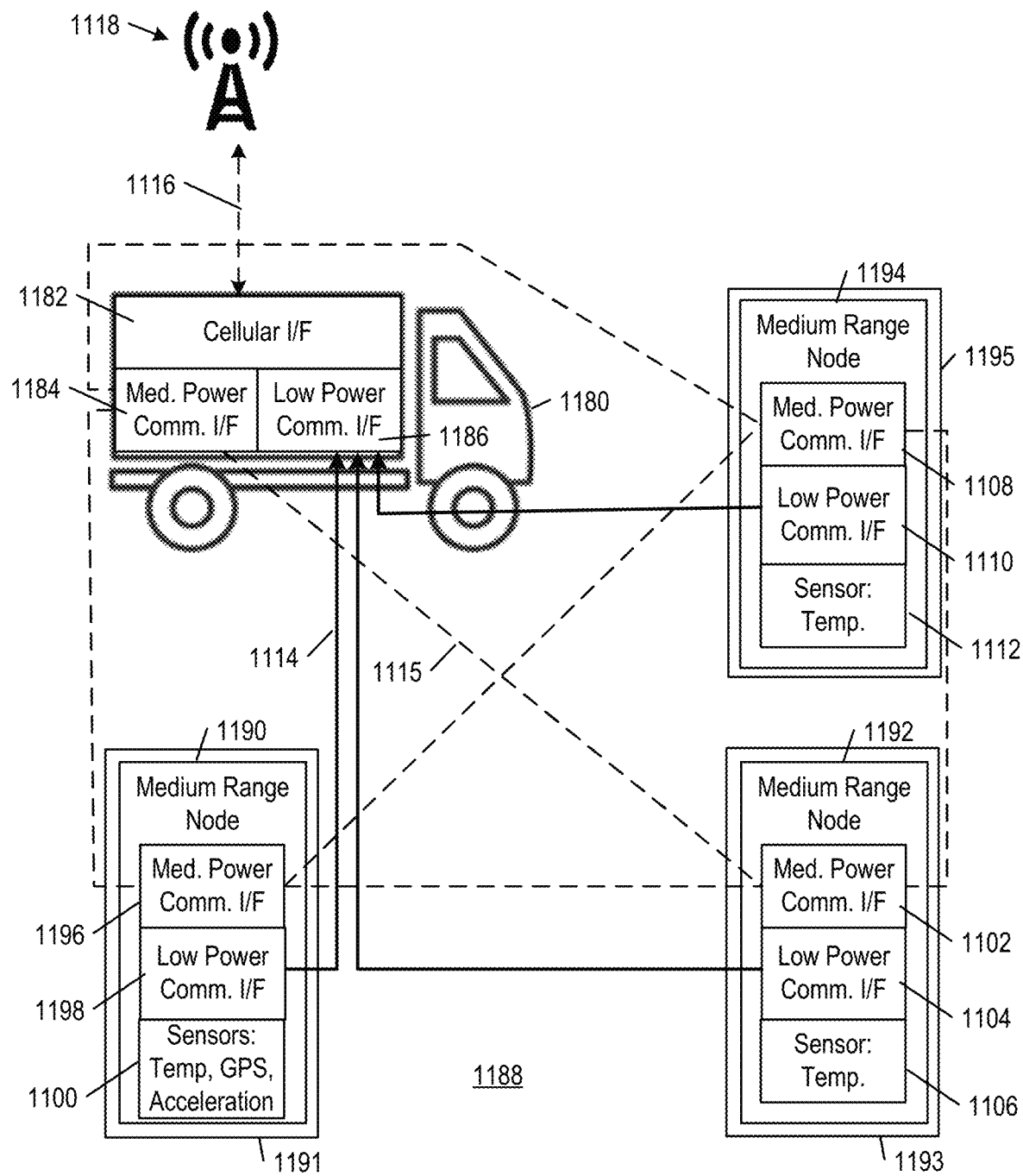
FIG. 11 is a schematic illustrating a truck configured as a mobile node, or mobile hub, with a cellular communications interface, a medium-power communications interface, and a low power communications interface, in embodiments.

FIG. 11 is a schematic illustrating a truck 1180 configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1194 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1115), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 12:
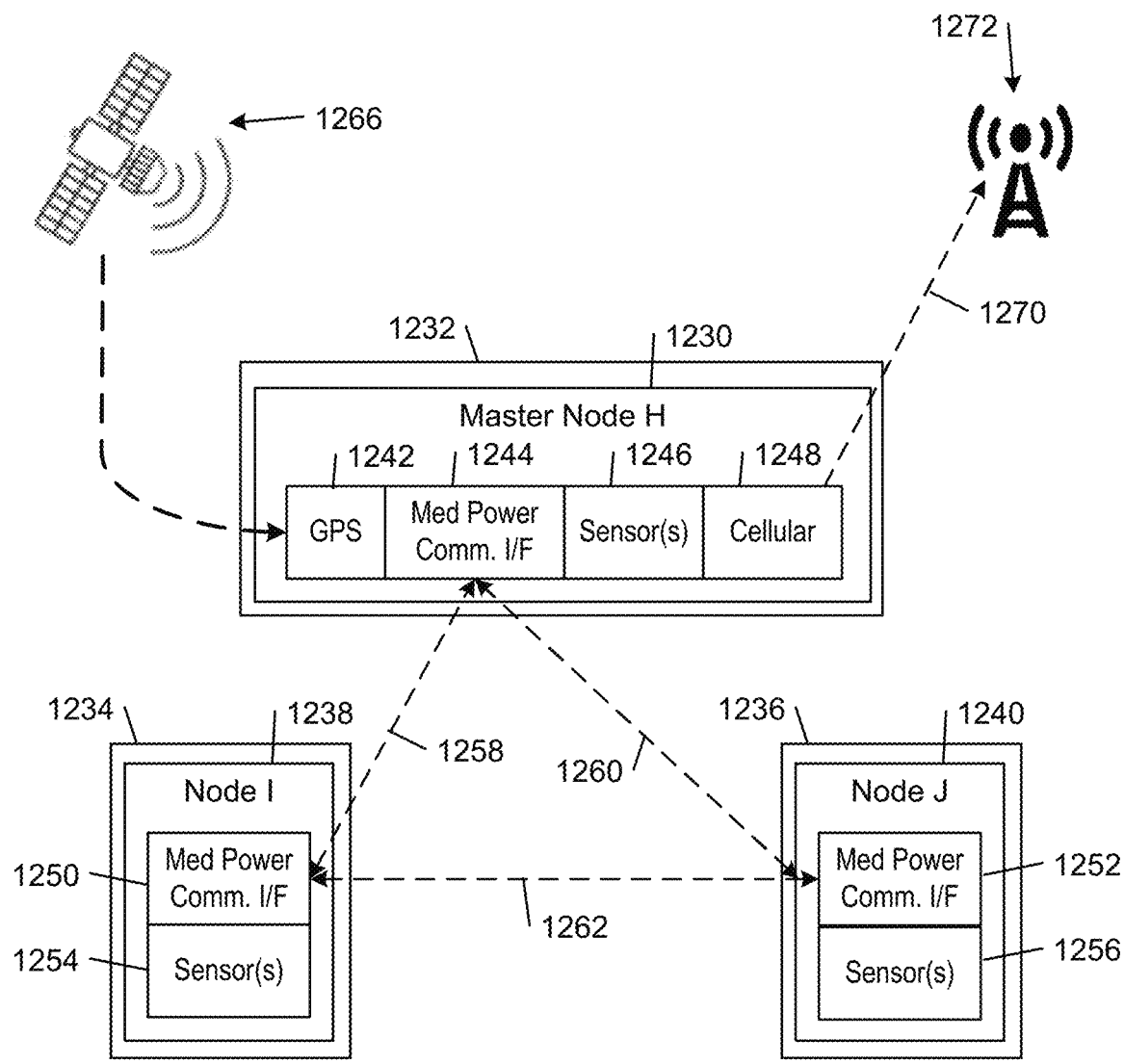
FIG. 12 is a schematic illustrating a master node associated with a logistic item that is grouped together with other logistic items associated with peripheral nodes, in embodiments.

FIG. 12 is a schematic illustrating a master node 1230 is associated with a logistic item 1232 (e.g., a package) and grouped together with other logistic items 1234, 1236 (e.g., packages) that are associated with respective peripheral nodes 1238, 1240. The master node 1230 includes a GPS receiver 1242, a medium power communications interface 1244, one or more sensors 1246, and a cellular communications interface 1248. Each of the peripheral nodes 1238, 1240 includes a respective medium power communications interface 1250, 1252 and one or more respective sensors 1254, 1256. In the illustrated embodiment, the peripheral and master nodes are connected to one another other over respective pairwise communications paths (shown by dashed lines). In some embodiments, the nodes 1230, 1238, 1240 communicate through respective LoRa communications interfaces over LoRa formatted communications paths 1258, 1260, 1262.

In the illustrated embodiment, the master and peripheral nodes 1230, 1238, 1240 include environmental sensors for obtaining information regarding environmental conditions in the vicinity of the associated logistic items 1232, 1234, 1236. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1230 periodically broadcasts advertising packets in the surrounding area. When the peripheral nodes 1238, 1240 are within range of master node 1230, and are operating in a listening mode, the peripheral nodes 1238, 1240 will extract the address of master node 1230 and potentially other information (e.g., security information) from the advertising packets. If, according to their respective programmatic code, the peripheral nodes 1238, 1240 determine that they are authorized to connect to the master node 1230, the peripheral nodes 1238, 1240 will attempt to pair with the master node 1230. In this process, the peripheral nodes 1238, 1240 and the master node 1230 determine each other's identities, capabilities, and services. For example, after successfully establishing a respective communication path 1258, 1260 with each of the peripheral nodes 1238, 1240 (e.g., a LoRa formatted communication path), the master node 1230 determines certain information about the peripheral nodes 1238, 1240, such as their identity information (e.g., peripheral nodes), their capabilities (e.g., measuring temperature data), and their services include transmitting temperature data to other nodes.

After establishing LoRa formatted communications paths 1258, 1260 with the peripheral nodes 1238, 1240, the master node 1230 transmits requests for the peripheral nodes 1238, 1240 to transmit their measured and/or locally processed temperature data to the master node 1230.

In the illustrated embodiment, the master node 1230 can determine its own location based on geolocation data transmitted by a satellite-based radio navigation system 1266 (e.g., GPS, GLONASS, and NAVSTAR) and received by the GPS receiver 1242 component of the master node 1230. In an alternative embodiment, the location of the master node 1230 can be determined using cellular based navigation techniques that use mobile communication technologies (e.g., GSM, GPRS, CDMA, etc.) to implement one or more cell-based localization techniques. After the master node 1230 has ascertained its location, the distance of each of the logistic items 1234, 1236 from the master node 1230 can be estimated based on the average signal strength of the advertising packets that the master node 1230 receives from the respective peripheral node. The master node 1230 can then transmit its own location and the locations of the package nodes H, J, and I to a server over a cellular interface connection with a cellular network 1272. Other methods of determining the distance of each of the logistic items 1234, 1236 from the master node 1230, such as Received Signal-Strength Index (RSSI) based indoor localization techniques, also may be used.

In some embodiments, after determining its own location and the locations of the peripheral nodes, the master node 1230 reports the location data, the collected and optionally processed (e.g., either by the peripheral nodes peripheral nodes 1238, 1240 or the master node 1230) sensor data to a server over a cellular communication path 1270 on a cellular network 1272.

Figure 13A:
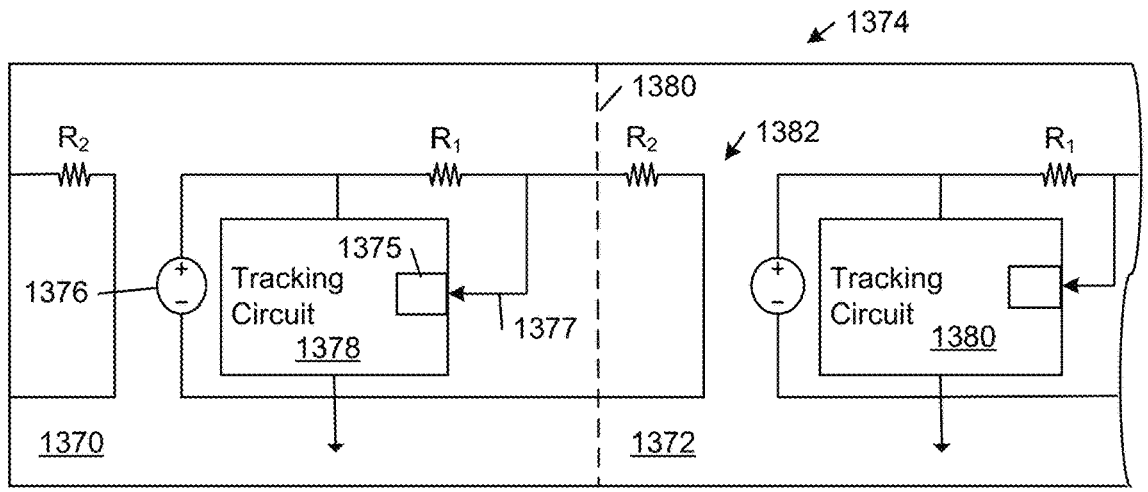
FIG. 13A is a schematic diagram illustrating an adhesive tracking product with a first example wake circuit that delivers power from an energy source to the tracking circuit in response to an event, in embodiments.

Referring to FIG. 13A, in some examples, each of one or more of the segments 1370, 1372 of a tracking adhesive product 1374 includes a respective circuit 1375 that delivers power from the respective energy source 1376 to the respective tracking circuit 1378 (e.g., a processor and one or more wireless communications circuits) in response to an event. In some of these examples, the wake circuit 1375 is configured to transition from an off-state to an on-state when the voltage on the wake node 1377 exceeds a threshold level, at which point the wake circuit transitions to an on-state to power-on the segment 1370. In the illustrated example, this occurs when the user separates the segment from the tracking adhesive product 1374, for example, by cutting across the tracking adhesive product 1374 at a designated location (e.g., along a designated cut-line 1380). In particular, in its initial, un-cut state, a minimal amount of current flows through the resistors R1 and R2. As a result, the voltage on the wake node 1377 remains below the threshold turn-on level. After the user cuts across the tracking adhesive product 1374 along the designated cut-line 1380, the user creates an open circuit in the loop 1382, which pulls the voltage of the wake node above the threshold level and turns on the wake circuit 1375. As a result, the voltage across the energy source 1376 will appear across the tracking circuit 1378 and, thereby, turn on the segment 1370. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 1378 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 13B:
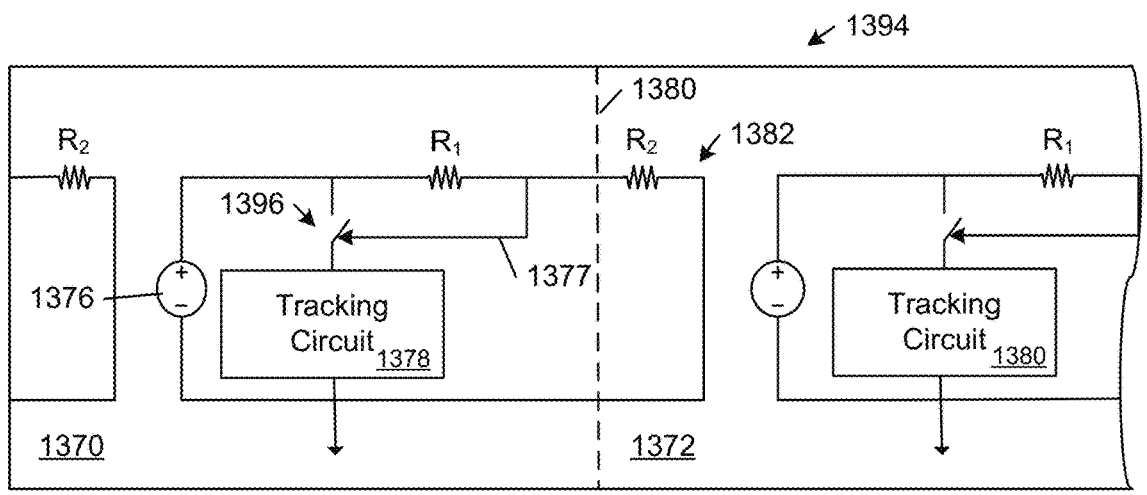
FIG. 13B is a schematic diagram illustrating an adhesive tracking product with a second example wake circuit that delivers power from an energy source to the tracking circuit in response to an event.

FIG. 13B shows another example of a tracking adhesive product 1394 that delivers power from the respective energy source 1376 to the respective tracking circuit 1378 (e.g., a processor and one or more wireless communications circuits) in response to an event. This example is similar in structure and operation as the tracking adhesive product 1394 shown in FIG. 13A, except that the wake circuit 1375 is replaced by a switch 1396 that is configured to transition from an open state to a closed state when the voltage on the switch node 1377 exceeds a threshold level. In the initial state of the tracking adhesive product 1394, the voltage on the switch node is below the threshold level as a result of the low current level flowing through the resistors R1 and R2. After the user cuts across the tracking adhesive product 1394 along the designated cut-line 1380, the user creates an open circuit in the loop 1382, which pulls up the voltage on the switch node above the threshold level to close the switch 1396 and turn on the tracking circuit 1378.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

Figure 13C:
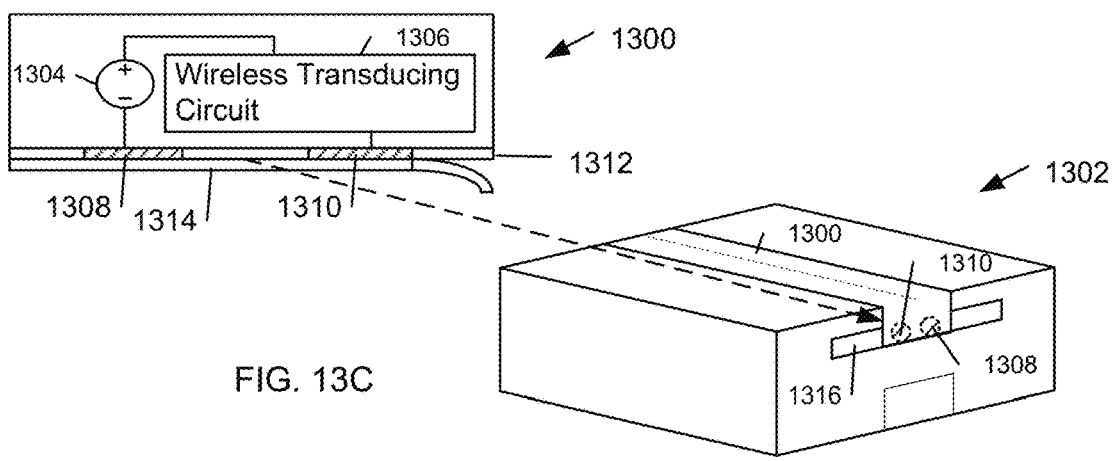
FIG. 13C is a diagrammatic cross-sectional front view of an example adhesive tape platform and a perspective view of an example asset, in embodiments.

FIG. 13C shows a diagrammatic cross-sectional front view of an example adhesive tape platform 1300 and a perspective view of an example asset 1302. Instead of activating the adhesive tape platform in response to separating a segment of the adhesive tape platform from a roll or a sheet of the adhesive tape platform, this example is configured to supply power from the energy source 1304 to turn on the wireless transducing circuit 1306 in response to establishing an electrical connection between two power terminals 1308, 1310 that are integrated into the adhesive tape platform. In particular, each segment of the adhesive tape platform 1300 includes a respective set of embedded tracking components, an adhesive layer 1312, and an optional backing sheet 1314 with a release coating that prevents the segments from adhering strongly to the backing sheet 1314. In some examples, the power terminals 1308, 1310 are composed of an electrically conductive material (e.g., a metal, such as copper) that may be printed or otherwise patterned and/or deposited on the backside of the adhesive tape platform 1300. In operation, the adhesive tape platform can be activated by removing the backing sheet 1314 and applying the exposed adhesive layer 1312 to a surface that includes an electrically conductive region 1316. In the illustrated embodiment, the electrically conductive region 1316 is disposed on a portion of the asset 1302. When the adhesive backside of the adhesive tape platform 1300 is adhered to the asset with the exposed terminals 1308, 1310 aligned and in contact with the electrically conductive region 1316 on the asset 1302, an electrical connection is created through the electrically conductive region 1316 between the exposed terminals 1308, 1310 that completes the circuit and turns on the wireless transducing circuit 1306. In particular embodiments, the power terminals 1308, 1310 are electrically connected to any respective nodes of the wireless transducing circuit 1306 that would result in the activation of the tracking circuit 1306 in response to the creation of an electrical connection between the power terminals 1308, 1310.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Cell Towers for Locationing of Assets

One aspect of the present embodiments includes the realization that using satellite navigation (e.g., GPS) to determine a current location uses a significant amount of power available to battery powered devices, particularly when a precise location is not required. The present embodiments solve this problem by using cell towers to estimate a current location. Advantageously, wireless signals from cell towers may be received without requiring a SIM or plan with the cell phone service provider providing the cell tower, and since cell towers are ubiquitous, their wireless signals are easily received from most locations. As described herein, in certain embodiments, tracking devices may not include SIM cards, whereas in other embodiments, the tracking devices may include SIM cards, which may or may not be enabled (e.g., having an associated plan with a cell tower operator). Further, even where the tracking device includes a SIM card that is enabled, the tracking device may not establish a communication channel with any of the cell towers when estimating its location. Assets transported via methods such as by train or truck are often located within wireless range of at least one cell tower. Cell towers may be interchangeably referred to as cell sites, cellular towers, or cellular base stations herein, and refer to any site having electronic communications equipment configured to create a cell in a cellular network.

Figure 14:
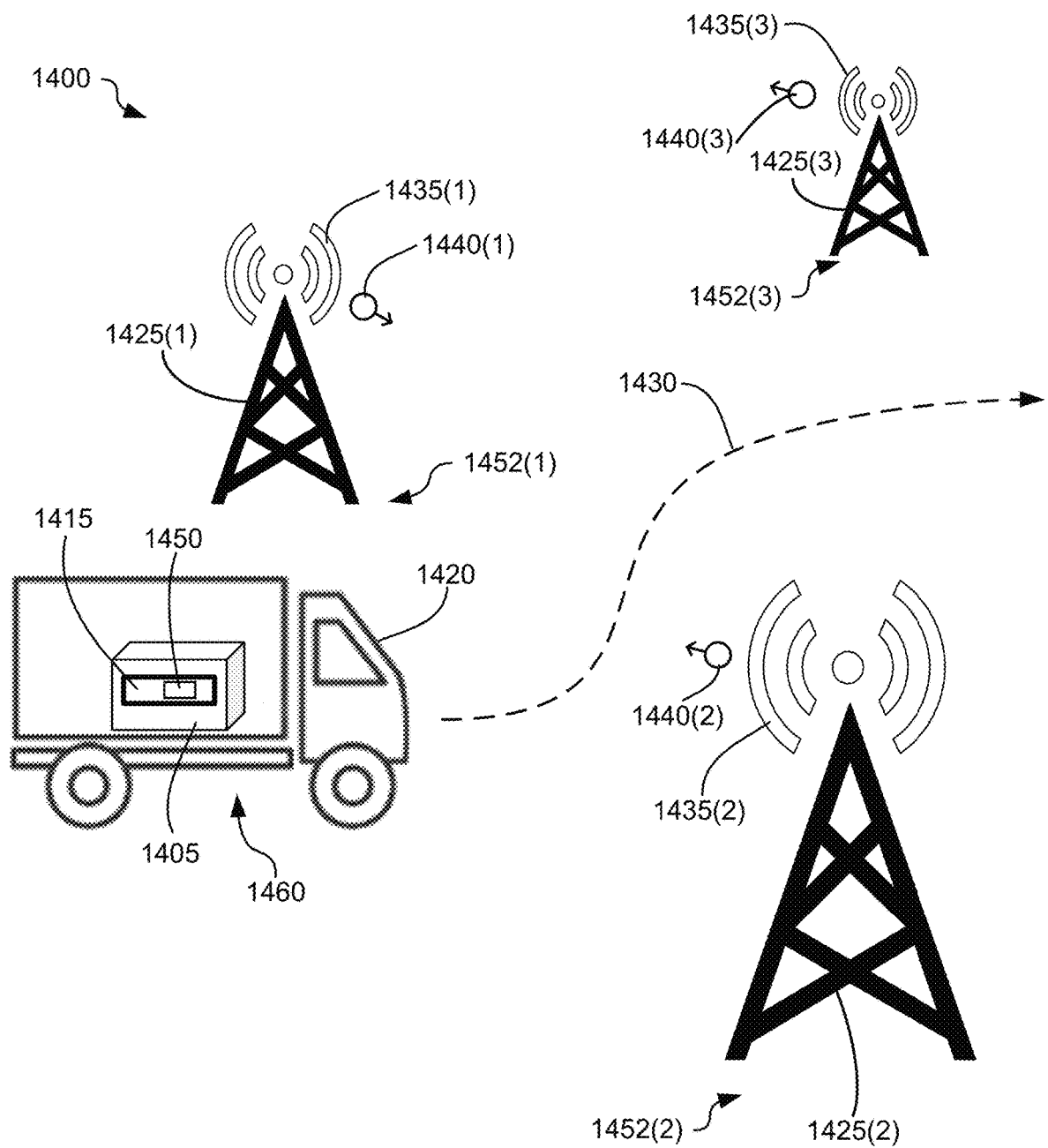
FIG. 14 is a schematic showing one example use of cell towers by a wireless tracking device for locationing an asset, in embodiments.

FIG. 14 is a schematic showing one example use of cell towers by a wireless tracking device 1415 (e.g., any of the wireless tape nodes, as described above in FIGS. 1-13) for locationing an asset 1405 (e.g., any of the assets, as described above with respect to at least FIG. 7-13) along at least part of an expected route 1430 within a geographic region 1400. Expected route 1430 represents the expected path taken by asset 1405 when being transported from a starting location to destination. Wireless tracking device 1415 is associated with asset 1405 (e.g., attached to asset 1405 or its packaging/container) to monitor progress of asset 1405 along expected route 1430. In this example, asset 1405 is transported by a vehicle 1420; however, other means of transport may be used without departing from the scope hereof. In certain embodiments, a tracking number used by a third-party to track a shipment may be loaded onto wireless tracking device 1415, and/or wireless tracking device 1415 is associated with that tracking number. Wireless tracking device 1415 may access a database to retrieve expected route 1430 from the third-party based on the tracking number, and download a cell tower data set corresponding to the expected route.

Wireless tracking device 1415 may represent certain ones of the wireless devices described above (e.g., a tape node, an adhesive tape agent, a wireless tracking device, etc., as describe in FIGS. 1-13C) that include one or more cellular communication circuits (e.g., high power communication interface 682" of FIG. 6C). Geographic region 1400 includes three cell towers 1425(1)-(3) (collectively referred to as cell towers 1425). Geographic region 1400 may have more or fewer cell towers 1425, and/or other features than those illustrated in FIG. 14. Asset 1405 may also be among other assets being transported by vehicle 1420 and/or by other vehicles (e.g., mobile gateway 712).

As asset 1405 follows expected route 1430, wireless tracking device 1415 moves in and out of a range of wireless signals 1435 broadcast from cell towers 1425. Each wireless signal 1435 includes an identifier that identifies the transmitting cell tower. Accordingly, this cell tower identifier may be used to retrieve information related to the cell tower, but that may not be transmitted by the cell tower, such as location coordinates (e.g., GPS coordinates, latitude/longitude, etc.) of the cell tower, a name or identity of a wireless carrier, cellular service provider, or other company associated with the cell tower. For example, wireless tracking device 1415 may retrieve this information from the wireless tracking system as needed based on the cell tower identifier.

At intervals (e.g., periodically, scheduled, event driven), wireless tracking device 1415 activates its cellular communication circuit to receive wireless signals 1435 that it is in range of. In one example, wireless tracking device 1415 activates its cellular communication circuit (e.g., high-power communications-interface 682" of FIG. 6C) at periodic time intervals, e.g., every hour. In another example, wireless tracking device 1415 activates its cellular communication circuit at scheduled times determined from locations on its expected route being within wireless range of certain cell towers 1425. In another example, wireless tracking device 1415 activates its cellular communication circuit responsive to an event (e.g., by processing sensor data corresponding to loading or unloading of the asset, and so on) detected by wireless tracking device 1415. Wireless tracking device 1415 may also determine a received signal strength indication (RSSI) for received wireless signal 1435. Wireless tracking device 1415 may estimate its distance from cell tower 1425 based on the RSSI of the received wireless signal 1435. When only one wireless signal 1435 is received, wireless tracking device 1415 may determine a location estimate 1460 is within a circular region around the geographic location of cell tower 1425, where a radius of the circular region corresponds to its estimated distance from the cell tower determined from the RSSI. When at least two wireless signals 1435 are received simultaneously, wireless tracking device 1415 may determine its location estimate 1460 to be within a certain area. When three or more wireless signals 1435 are received simultaneously, wireless tracking device 1415 may determine its location estimate 1460 using trilateration between the cell tower 1425 locations and using the respective RSSI values to estimate tower distances. In certain embodiments, wireless tracking device 1415 includes specific triangulation and/or trilateration hardware for calculating location estimate 1460. In some embodiments, the received wireless signal provides basic information about the cell towers including, for example, an identifier of the cell tower and/or a location of the cell tower.

In certain embodiments, wireless tracking device 1415 may include a SIM card that enables communication over a cellular provider's cellular network. In some cases, the SIM card is not activated, and no service plan is active with the cellular provider (e.g., there is no paid data plan or cellular data plan established for the tracking device's cellular communication circuit) and thus the cellular communication circuit is not used by wireless tracking device 1415 for normal communication. Even when the SIM card is activated and/or a service plan is active, wireless tracking device 1415 may not use cellular communication during normal operation. However, wireless communication device 1415 may receive the broadcast wireless signals 1435 without using its SIM card or service plan. With or without the activated SIM card, at intervals (e.g., at regular intervals, scheduled times, or at certain events) wireless tracking device 1415 activates its cellular communication circuit to receive wireless signals 1435 broadcast from cell towers 1425 that it is within wireless range of. That is, wireless tracking device 1415 activates its cellular communication circuit, receives available cellular wireless signals 1435 from cell towers 1425 it is within range of, and then deactivates its cellular communication circuit. Wireless tracking device 1415 may receive the wireless signals 1435 without communicating over the cellular network.

In certain embodiments, when wireless tracking device 1415 is unable to estimate its location using received wireless signals 1435 (e.g., where the cell tower identifier is unknown) and is unable to communicate with other nodes of the wireless tracking system using medium or low-power communication (e.g., using Bluetooth, Wi-Fi, LORA, etc.), wireless tracking device 1415 may activate its SIM card and corresponding carrier plan to enable cellular communication to make a call to an administrator or user, or to establish a cellular connection with the wireless tracking system, to report its indeterminate location and/or escalate further actions. Other events (e.g., temperature ranges, mishandling, etc.) may also trigger this SIM card/plan activation when low and medium-power communication are unavailable or unusable. For example, the wireless tracking device 1415 may be unable to determine its location using low-powered (e.g., Bluetooth) interactions, and may therefore start receiving wireless signals 1435 to use trilateration to estimate its location. When this trilateration is unsuccessful, such as when the wireless tracking device 1415 has moved away from expected route 1430, and received cell tower identifiers are unknown, wireless tracking device 1415 may then activate its SIM card and corresponding carrier plan to attempt cellular communication. In certain embodiments, wireless tracking device 1415 may also activate its GPS receiver (if included) to determine its location prior to communicating with the wireless tracking system and escalating action.

Wireless signals 1435 include a cell tower identifier 1440. For example, wireless signal 1435(1) includes cell tower identifier 1440(1), wireless signal 1435(2) includes cell tower identifier 1440(2), and wireless signal 1435(3) includes cell tower identifier 1440(3), where each cell tower identifier 1440(1)-(3) uniquely identifies cell tower 1425(1)-(3), respectively. This receiving of any wireless signal 1435 broadcast from cell towers 1425 that the wireless tracking device 1415 is in wireless range of may be referred to as "cell tower sniffing" or "sniffing."

Where location information of cell towers is unavailable, wireless tracking device 1415 may store the received cell tower identifier 1440, the RSSI of the respective wireless signal 1435, and any other received information, with a timestamp in its memory. At a later time, wireless tracking device 1415 may transmit this stored information (e.g., at least cell tower identifier 1440, the RSSI, and the timestamp) to another entity of the wireless tracking system, thereby allowing trilateration to be retroactively performed when the location of the respective cell tower(s) 1425 is learned. Alternatively, wireless tracking device 1415 may receive geographic location information of the cell tower(s) at a later time from another entity of the wireless tracking system, thereby allowing wireless tracking device 1415 to perform trilateration retroactively.

Wireless tracking device 1415 may include a local table 1450 that stores cell tower information and includes a plurality of entries that each define a cell tower identifier and respective geographic location. For example, to allow wireless tracking device 1415 to determine location estimate 1460 from cell towers 1425(1)-(3), local table 1450 may have three entries: cell tower identifier 1440(1) with geographic location coordinates defining location 1452(1) of cell tower 1425(1), cell tower identifier 1440(2) with geographic location coordinates defining location 1452(2) of cell tower 1425(2), and cell tower identifier 1440(3) with geographic location coordinates defining location 1452(3) of cell tower 1425(3). In one example of operation, wireless tracking device 1415 decodes cell tower identifier 1440(1) from wireless signal 1435(1), retrieves geographic location coordinates corresponding to cell tower identifier 1440(1) from local table 1450, and determines its location estimate 1460 as a circular region centered at location 1452(1) and with a radius based on the respective RSSI of received wireless signal 1435(1). In another example of operation, wireless tracking device 1415 decodes cell tower identifier 1440(1) from wireless signal 1435(1), cell tower identifier 1440(2) from wireless signal 1435(2), cell tower identifier 1440(3) from wireless signal 1435(3), retrieves geographic location coordinates corresponding to cell tower identifiers 1440(1), 1440(2), and 1440(3) from local table 1450, and determines its location estimate 1460 using trilateration and locations 1452(1), 1452(2), and 1452(3) based on the respective RSSI of received wireless signal 1435(1), 1435(2), and 1435(3), respectively.

In certain embodiments, the SIM card of wireless tracking device 1415 remains inactive until a condition or event is detected by wireless tracking device 1415. Wireless tracking device 1415 may determine its location in many different ways. For example, wireless tracking device 1415 may estimate its location based on velocity and last known location when equipped with motion sensors, or may determine its locations by receiving information from vehicle 1420 when coupled therewith, or may determine its location through interaction with a human operator's client device that may include a GPS receiver, etc. Wireless tracking device 1415 may receive a location from gateways, other tape nodes, wireless tracking system infrastructure, client devices, and so on, without needing to activate its own cellular receiver or GPS receiver. For example, using low power wireless connectivity (e.g., Bluetooth or Wi-Fi), wireless tracking device 1415 may receive location data from other devices, such as a vehicular gateway (e.g., mobile gateway 712, FIG. 7), vehicle based GPS navigation apparatus, a driver's client device (e.g., smart phone), and so on. In certain embodiments, using wireless signals 1435 and trilateration to determine location estimate 1460 is a backup method used by wireless tracking device 1415 to estimate its location when other methods have failed to provide location information for a certain period (e.g., 1 hour, four hours, six hours, and so on), which may be configurable.

When, based on location estimate 1460, location determined in other ways, or lack of location information (e.g., when, for a certain period, it is unable to determine location and/or unable to communicate via Bluetooth or LORA and/or unable to receive expected wireless signal), wireless tracking device 1415 may determine an event (e.g., reaching a destination, deviation from an expected route, reaching a route landmark event, etc.) has occurred. Accordingly, wireless tracking device 1415 may activate its SIM card and send its location estimate 1460 and/or the determined event to a server via a cellular network. However, wireless tracking device 1415 may also use other nodes (e.g., gateway) of the wireless tracking system when available (e.g., within wireless communication range) to send location estimate 1460 and/or the event to the server. For example, wireless tracking device 1415 may activate its SIM card based when location estimate 1460 is within a threshold distance of a target location (e.g., a destination of asset 1405). In another example, wireless tracking device 1415 activates its SIM card when location estimate 1460 is outside of a threshold distance from the target location. In another example, wireless tracking device 1415 activates its SIM card when location estimate 1460 is outside of a threshold distance from expected route 1430 (e.g., a target path, and/or trajectory). U.S. patent application Ser. No. 17/592,347, which is incorporated herein in its entirety, provides further details on remote activation of a SIM card. For example, activating the network carrier access plan may include providing information relevant to the SIM card (such as identifiers for the SIM card), contact information associated with the SIM card, including a mailing address and/or a billing address, payment information for paying for the network carrier's services, and other information to the network carrier. The information, including the association between the SIM card and the asset, may be stored in a database of wireless tracking system and retrieved by the server when activating the network carrier access plan. In some embodiments, the server automatically completes one or more forms on a website for requesting the activation of cellular and submits the forms over the internet, on behalf of wireless tracking device 1415. In some embodiments, the server makes one or more phone calls to network carrier's customer service, sales, or other departments. The server, in further embodiments, may use an automated intelligence (AI) voice assistant to converse with a customer service or other representative for the network carrier and order the activation of the network plan associated with the SIM card. For example, a standard protocol for SIM card activation may include making a cellular phone call from the cellular communication interface of wireless tracking device 1415 to a predefined phone number of the cellular network carrier, which initiates the activation of the SIM card in the cellular network carrier's system and/or database.

Local table 1450 may store a portion of an external database defining cell tower identifiers and respective location coordinates. Accordingly, the local table may be populated based on third-party information. In certain embodiments, local table 1450 is populated from information received from other nodes of the wireless tracking system.

Figure 15:
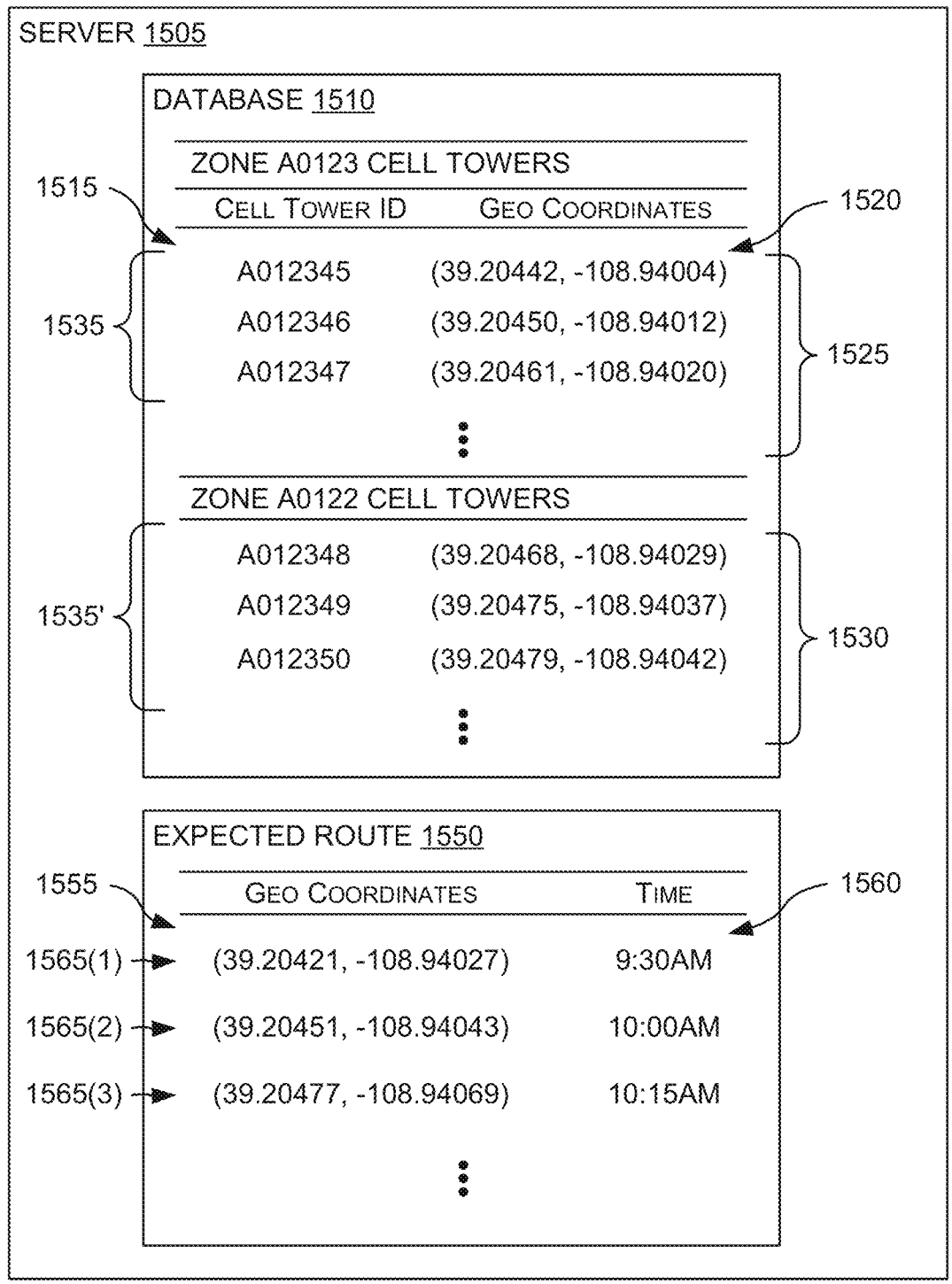
FIG. 15 is a block diagram showing one example database storing cell tower information, in embodiments.

FIG. 15 is a block diagram showing one example database 1510 storing cell tower information. FIGS. 14 and 15 are best viewed together with the following description. Database 1510 is shown within a server 1505 (e.g., server 704 of network communications environment 700 of FIG. 7), however, database 1510 may be implemented external to server 1505 without departing from the scope hereof. Server 1505 is a computer apparatus that includes at least one processor and memory with machine-readable instructions that are executed to perform the functionality of server 1505 described herein. In certain embodiments, server 1505 may distribute at least part of database 1510 to other nodes of the wireless tracking system (e.g., to one or more of a gateway node, a client device, another tape node, a master node associated with an asset or a group of assets). Accordingly, relevant portions (e.g., based on geographic area of each node) may be stored by certain nodes of the wireless tracking system and may be transferred to a wireless tracking device (e.g., wireless tracking device 1415 of FIG. 14) when requested. Although transfers are described as being from server 1505 in the following example, the transfers may be from and/or via other nodes of the wireless tracking system that are more local to the wireless tracking device. In one example, where vehicle 1420 is expected to traverse a large area delivering assets, a master node within vehicle 1420 may include a corresponding portion of database 1510, and may download (e.g., using local low-powered/short-range communication) a smaller portion, corresponding to expected route 1430 to wireless tracking device 1415.

Server 1505 is also shown storing an expected route table 1550 that represents expected route 1430 of FIG. 14. As shown, expected route table 1550 includes a plurality of entries 1565 that each include geographic coordinates 1555 of a location along expected route 1430 and an arrival time 1560 of wireless tracking device 1415 and asset 1405 at that location. In certain embodiments, times 1560 may include a tolerance (e.g., thirty minutes) to allow for unpredictable variation in progress of vehicle 1420 along expected route 1430. In other embodiments, times 1560 may represent a period that allows for variation in arrival time of asset 1405 at the corresponding geographic location 1555, or times may be stored as duration values relative to a start time of vehicle 1420. In certain embodiments, geographic coordinates 1555 are determined based on time intervals that correspond to a schedule of when wireless tracking device 1415 determines its location estimate. In other embodiments, geographic coordinates 1555 are determined based on features of expected route 1430, such as stopping points, check points, and so on. In certain embodiments, at least part of expected route table 1550 is sent to wireless tracking device 1415 where it is stored in local memory, such as part of local table 1450.

Database 1510 is shown as a relational database that implements a table structure that includes cell tower identifiers 1515 (e.g., cell tower identifiers 1440 of FIG. 14) and respective cell tower geographic coordinates 1520 (e.g., cell tower locations 1452). However, database 1510 may be implemented as other types of databases without departing from the scope hereof. In the example of FIG. 15, cell tower identifiers 1515 include "A012345," "A012346," and "A012347" that may represent cell tower identifiers 1452 (1)-(3) of cell towers 1425(1)-(3), respectively. Each cell tower identifier 1515 is associated with geographic coordinates 1520 of the respective cell tower. Geographic coordinates 1520 may have other formats without departing from the scope hereof. In certain embodiments, database 1510 includes additional information, such as one or more of: a type of the cell tower (e.g., 3G, 4G, 5G, etc.), an owner name, a carrier name (e.g., Verizon®, AT&T®, etc.), or company name associated with the cell tower, output signal strength, signal frequency/frequency bands, historical data on the output signal strength, RSSI previously recorded by other wireless tracking devices, other characteristic information on the cell tower, and the like.

In the example of FIG. 15, server 1505 has sorted the entries within database 1510 based on geographic zones, illustratively shown as geographic zone 1525 with an identifier "Zone A0123" and geographic zone 1530 with an identifier "Zone A0122." In one example of operation, where geographic zone 1525 covers an area that includes locations of expected route 1430, server 1505 may send a cell tower data set including cell tower information of geographic zone 1525 to wireless tracking device 1415. In other embodiments, server 1505 may sort entries based on other factors, such as by city, state, county, country, or another scale of area. In certain embodiments, server 1502 may sort entries within database 1510 based on proximity to checkpoints along an expected route (e.g., expected route 1430) of assets being tracked by wireless tracking device 1415. Accordingly, server 1505 may determine and send a cell tower data set 1535 containing cell tower information relevant to expected route 1430 to wireless tracking device 1415. Advantageously, local table 1450 of wireless tracking device 1415 only stores information needed to determine location estimate 1460 from cell towers it is likely to encounter. Cell tower data set 1535 includes cell tower identifiers and geographic coordinates of cell towers 1425 that wireless tracking device 1415 is expected to be able to receive wireless signals from for a next period (e.g., one hour, four hours, six hours, one day, and so on). The size of cell tower data set 1535 may be defined by available memory within wireless tracking device 1415.

Large-scale transportation of assets frequently follows similar routes and server 1505 may determine expected route 1430 for asset 1405 based on a starting location of asset 1405 (e.g., a location determined upon initiating the tracking device) and a destination (e.g., from a tracking number of the asset, delivery contract, etc.). For example, a carrier of asset 1405 may use one particular route when traversing at least part of the journey between a starting location and destination, particularly when moving the asset over larger distances between transportation centers. Where memory space available to local table 1450 is sufficient, wireless tracking device 1415 may download all relevant cell tower information for expected route 1430. Where memory space is more limited, wireless tracking device 1415 may download only the most relevant portion of cell tower information for each stage of expected route 1430. That is, wireless tracking device 1415 may first download cell tower information for a first portion of expected route 1430, and, as indicated by location estimate 1460, when nearing the end of the first portion, may download cell tower information for a next portion of expected route 1430, and so on until the destination is reached.

In one example of operation, wireless tracking device 1415 downloads the first portion of cell tower information when being adhered or affixed to the asset at the starting location. In certain embodiments, each first or next portion of cell tower information is downloaded from database 1510 to wireless tracking device 1415 for a period when wireless tracking device 1415 is expected to be in the area corresponding to cell tower information in that portion. In one example, wireless tracking device 1415 downloads cell tower information relevant to the next period (e.g., 12 hours, 1 day, etc.). Accordingly, a next portion of cell tower information for the subsequent period is downloaded from database 1510 to wireless tracking device 1415 at or near the end of the first period. In other embodiments, a first portion of cell tower information downloaded from database 1510 to wireless tracking device 1415 defines a geofence that triggers downloading of a next portion of the cell tower information from database 1510, and so on, based on the determined location estimate 1460. Accordingly, the downloading of cell tower information from database 1510 may be iterative based on progress of wireless tracking device 1415 along expected route 1430. Accordingly, local table 1450 contains cell tower information that is relevant to the location of wireless tracking device 1415 and/or its expected movements.

In certain embodiments, local table 1450 also stores at least part of expected route 1430, defining one or more of path, trajectory, locations and/or areas, and respective times and/or periods that the wireless tracking device is expected to be at those locations. Accordingly, local table 1450 allows wireless tracking device 1415 to determine which cell towers 1425 it should be able to receive wireless signals 1435 from, and based on the stored respective geographic locations, allows wireless tracking device 1415 to determine its location estimate 1460.

Wireless tracking device 1415 prioritizes low-power/short-range communications for downloading the cell tower information, thereby conserving battery power. For example, wireless tracking device 1415 may download cell tower information relevant to expected movement of the wireless tracking device over a next period or portion of the expected route 1430 when lower cost communication with the wireless tracking system (e.g., server 1505) is available, such as at the route start, a staging area, a transfer area, while being inspected, and so on. Accordingly, wireless tracking device 1415 preserves battery power by using only low-powered/short-range communication.

In certain embodiments, the cell tower information is compressed to reduce communication/download time, thereby preserving battery power, and extending battery life of wireless tracking device 1415. In one example, in the downloaded cell tower information, a first set of geographic coordinates are absolute (e.g., uncompressed) and subsequent geographic coordinates are relative to the first set of geographic coordinates. Accordingly, only decimal portion differences between subsequent geographic coordinates and the first set of geographic coordinates are communicated, and unchanged decimals are not communicated. In another example, the cell tower information, expected route 1430, and/or timeframe of the asset is compressed using run-length encoding, or another suitable compression algorithm, prior to transmission to wireless tracking device 1415.

In certain embodiments, wireless tracking device 1415 includes dedicated hardware and/or software for triangulating its location estimate 1460 without connecting to server 1505 or other nodes of the wireless tracking system. In other embodiments, wireless tracking device 1415 sends received cell tower identifiers 1440, timestamps indicating when the respective wireless signal 1435 was received, and their respective RSSI to other nodes of the wireless tracking system, and the other nodes determine location estimate 1460 of wireless tracking device 1415. The other nodes may transmit the determined location estimate 1460 to one or more of wireless tracking device 1415, server 1505, and another node of the wireless tracking system. In certain embodiments, wireless tracking device 1415 determines and send location estimate 1460 to one or more of server 1505, and other nodes of the wireless tracking system. In other embodiments, wireless tracking device 1415 stores the determined location estimate 1460 with a timestamp in its memory, and, at a later time (e.g., upon arrival at an intermediate location or destination, upon establishing a scheduled communication connection to another node of the wireless tracking system, upon receiving a location request from another node of the wireless tracking system, or the like), upload one or more stored location estimates and corresponding timestamps to the wireless tracking system or nodes thereof.

In certain embodiments, wireless tracking device 1415 compresses location estimate 1460 and its timestamp prior to transmission, to reduce cost (e.g., power and communication time). The compression may use a run-length encoding or any other suitable data compression algorithm. Where wireless tracking device 1415 intends to transmit multiple location estimates and timestamps, compression may be implemented by sending a first location estimate uncompressed and sending only a decimal of a difference between the first location estimate and each subsequent location estimate (e.g., relative distance).

In some embodiments, based on the determined location estimates and corresponding timestamps received from wireless tracking device 1415, the wireless tracking system may provide a notification or an update describing a current status of the delivery of the asset to one or more users of the wireless tracking system. For example, the wireless tracking system may project an expected arrival time based on a current or latest location estimate 1460 from wireless tracking device 1415, may determine whether transportation of asset 1405 is delayed, expedited, or is experiencing a deviation from expected route 1430, and so on. In other embodiments, wireless tracking device 1415 may determine whether transportation of asset 1405 is delayed, expedited, and/or is experiencing deviations from expected route 1430 during transportation, and in response may perform one or more actions, such as transmitting an unscheduled notification to the wireless tracking system, transmitting a notification to an operator (e.g., a truck driver), or transmitting a notification to an end user of the wireless tracking system.

Figure 16:
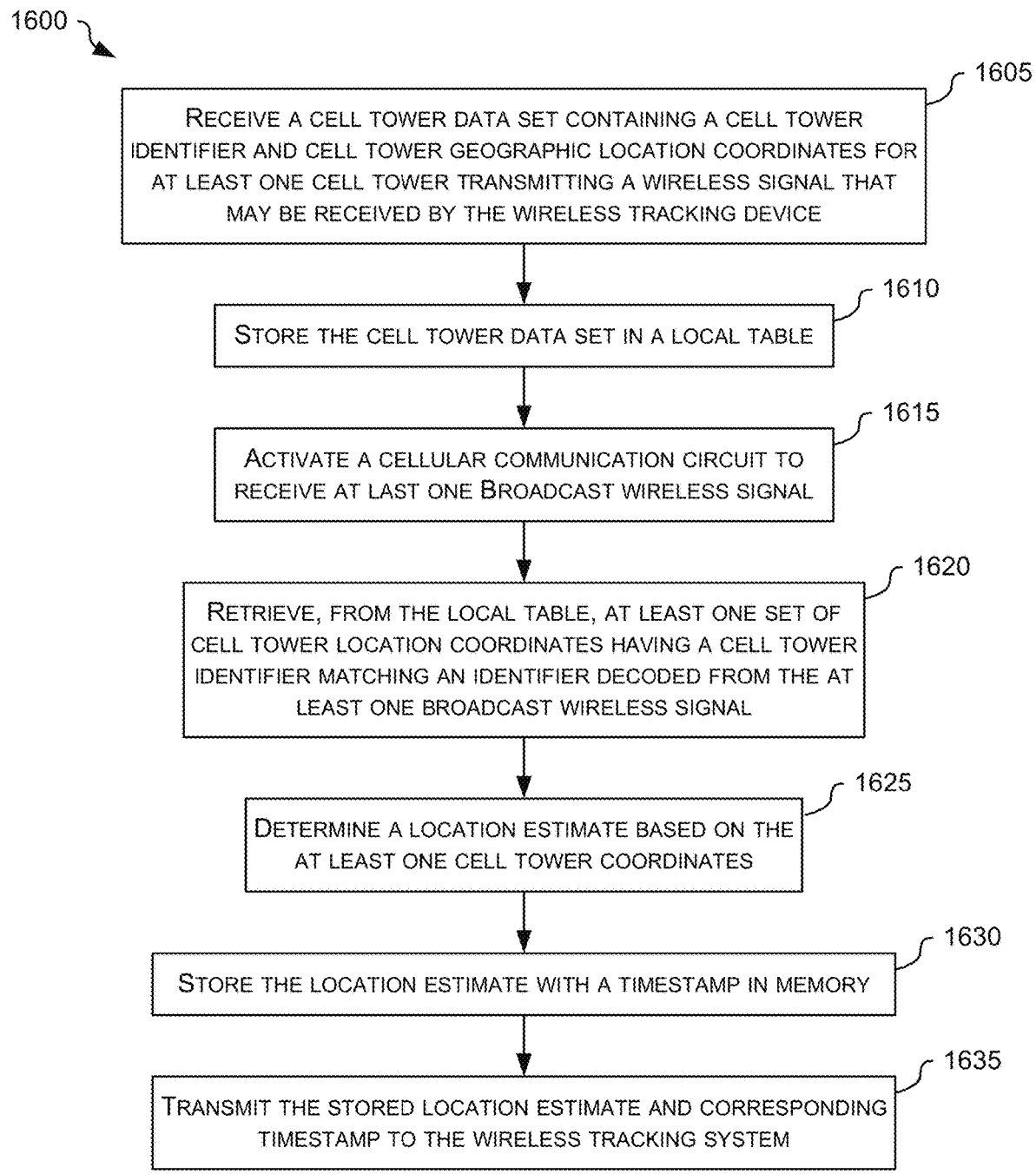
FIG. 16 is a flowchart illustrating one example method for using cell towers for locationing of assets, in embodiments.

FIG. 16 is a flowchart illustrating one example method 1600 for using cell towers for locationing of assets. Method 1600 is implemented in wireless tracking device 1415 of FIG. 14, for example. In block 1605, method 1600 receives a cell tower data set containing a cell tower identifier and cell tower geographic location coordinates for at least one cell tower transmitting a wireless signal that may be received by the wireless tracking device. In one example of block 1605, wireless tracking device 1415 receives cell tower data set 1535 from server 1505. In block 1610, method 1600 stores the cell tower data set in a local table. In one example of block 1610, wireless tracking device 1415 stores cell tower data set 1535 in local table 1450.

In block 1615, method 1600 activates a cellular communication circuit to receive at least one broadcast wireless signal. In one example of block 1615, wireless tracking device 1415 activates high-power communications-interface 682" of FIG. 6C to receive any of wireless signals 1435. In block 1620, method 1600 retrieves, from the local table, at least one set of cell tower location coordinates having a cell tower identifier matching an identifier decoded from the at least one broadcast wireless signal received in block 1615. In one example of block 1620, wireless tracking device 1415 retrieves geographic coordinates 1520 defining cell tower location 1452(1) based on cell tower identifier 1515 matching cell tower identifier 1440(1) received in wireless signal 1435(1). In block 1625, method 600 determines a location estimate based on the at least one cell tower coordinates. In one example of block 1625, wireless tracking device 1415 determines location estimate 1460 based on cell tower location 1452(1) and an RSSI value of received wireless signal 1435(1). In another example of block 1625, wireless tracking device 1415 determines location estimate 1460
using trilateration based on cell tower locations 1452(1)-(3) and RSSI values of received wireless signals 1435(1)-(3), respectively. In block 1630, method 1600 stores the location estimate with a timestamp in memory. In one example of block 1630, wireless tracking device 1415 stores location estimate 1460 in its memory along with a timestamp indicating a time of location estimate 1460.

In one example, blocks 1615 through 1630 repeat at intervals (e.g., once per hour, once per two hours, and so on) to store multiple location estimates 1460 with a respective timestamp in its memory. In another example, blocks 1615 through 1630 are performed once before continuing with block 1635.

In block 1635, method 1600 transmits the determined location estimate and corresponding time stamp to the wireless tracking system. In one example of block 1635, when wireless tracking device 1415 retrieves from memory and transmits stored location estimates 1460 and respective timestamps to server 1505 when within short-range or medium-range communication range of another node of the wireless tracking system (e.g., upon arriving at an intermediate warehouse or a destination having Wi-Fi or Bluetooth connections available). For example, the tracking device 1415 may uses one or more of Bluetooth, Wi-Fi, LoRa, etc. In another example of block 1635, wireless tracking device 1415 transmits location estimate 1460 and a timestamp immediately, or shortly after, it is determined.

Blocks 1605 through 1635 may repeat for subsequent portions of expected route 1430, or until wireless tracking device 1415 reaches the destination.

In other embodiments, blocks 1605, 1610, and 1620-1635 are performed by another entity of the wireless tracking system, and the method may comprise additional, fewer, or different steps than those described in FIG. 16.

Time Based Cell Tower Locationing

Time based cell tower locationing requires less computation and power since wireless tracking device 1415 does not determine location estimate 1460 and does not compare locations against an expected route. Rather, wireless tracking device 1415 receives a cell tower data set with entries defining expected periods when certain cell tower identifiers should be receivable by wireless tracking device 1415. Accordingly, wireless tracking device 1415 determines process along expected route 1430 based on when these certain cell tower identifiers are received.

Figure 17:
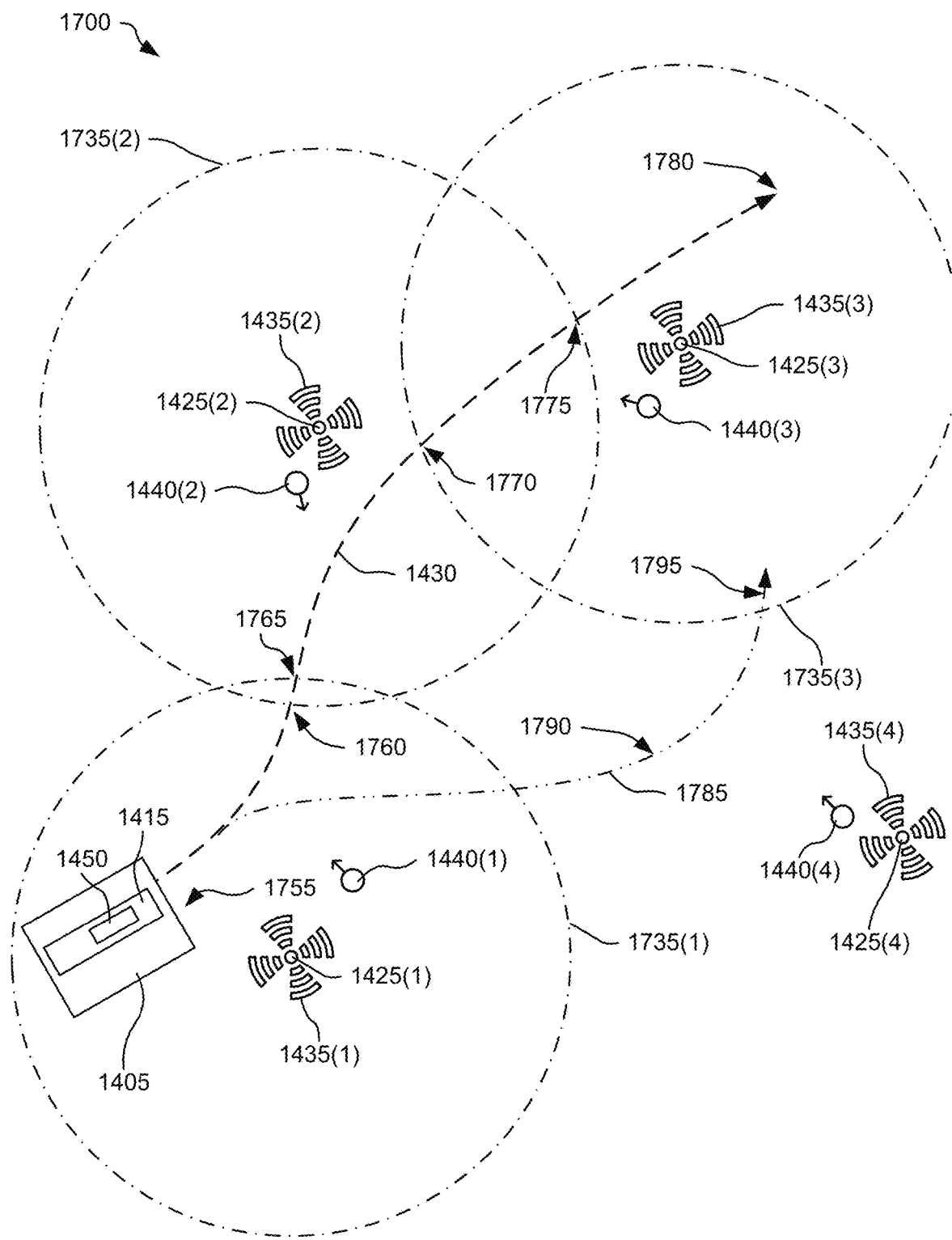
FIG. 17 is a plan view schematic illustrating use of cell towers for locationing of asset based on time, in embodiments.

FIG. 17 is a plan view schematic 1700 illustrating use of cell towers 1425 for locationing of asset 1405 based on time. Continuing the example of FIG. 14, where asset 1405 and associated wireless tracking device 1415 travel along an expected route 1430 when transported by delivery vehicle 1420 (not shown for clarity of illustration), FIG. 17 further shows wireless transmission ranges 1735(1)-(3), represented as dashed circles, of cell towers 1425(1)-(3), respectively.

Figure 18:
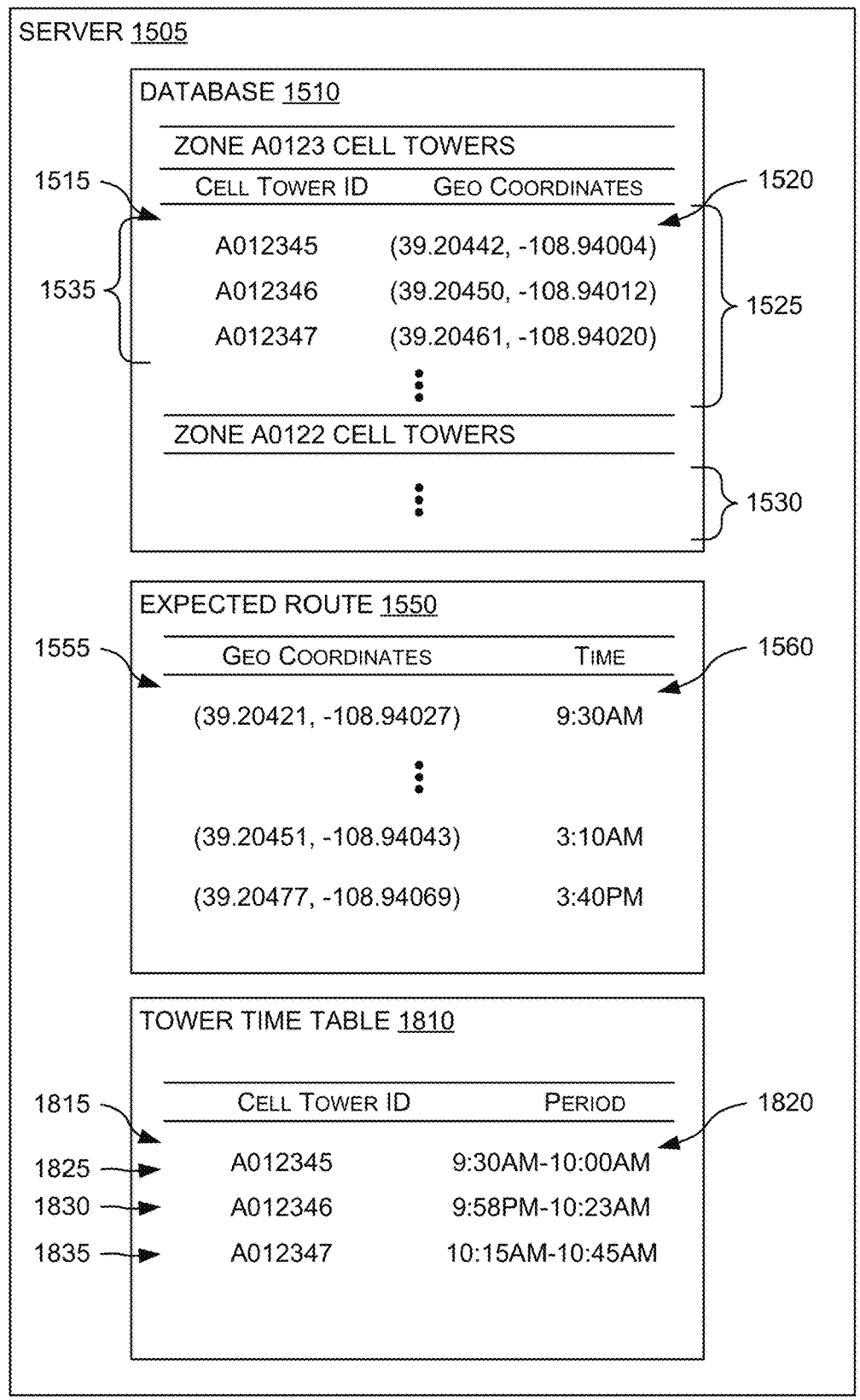
FIG. 18 is a block diagram showing the server, database, and expected route table of FIG. 15, and further with a tower time table, in embodiments.

FIG. 18 is a block diagram showing server 1505, database 1510, and expected route table 1550 of FIG. 15, and further shows server 1505 storing a tower time table 1810. Tower time table 1810 is generated by server 1505 based on database 1510 and expected route table 1550 and defines, for each cell tower 1425 along expected route 1430, a cell tower identifier 1815 and a respective period 1820 indicated when wireless tracking device 1415 should be able to receive a wireless signal (e.g., one of wireless signals 1435) with that cell tower identifier. At least part of tower time table 1810 may be sent (e.g., as a cell tower data set) to wireless tracking device 1415 where it is stored in local memory (e.g., as part of local table 1450). FIGS. 17 and 18 are best viewed together with the following description.

In the example of FIGS. 17 and 18, asset 1405 and wireless tracking device 1415 plan to travel from a starting location 1755, leaving at 9:30 AM, to follow expected route 1430 through locations 1760, 1765, 1770, and 1775 to arrive at a destination 1780. A first entry 1825 of tower time table 1810 has a cell tower identifier of A012345, which corresponds to cell tower 1425(1), and a period of 9:30 AM-10 AM, indicating that wireless tracking device 1415 should be able to receive wireless signal 1435(1) for the first thirty minutes, corresponding to a portion of expected route 1430 between starting location 1755 and location 1765. Second entry 1830 of tower time table 1810 has a cell tower identifier of A012346, which corresponds to cell tower 1425(2), and a period of 9:58 AM-10:23 AM, indicating that wireless tracking device 1415 should be able to receive wireless signal 1435(2) between 9:58 AM-10:23 AM, corresponding to a portion of expected route 1430 between location 1760 and location 1775. Third entry 1835 of tower time table 1810 has a cell tower identifier of A012347, which corresponds to cell tower 1425(3), and a period of 9:58 AM-10:23 AM, indicating that wireless tracking device 1415 should be able to receive wireless signal 1435(2) between 10:15 AM-10:45 AM, corresponding to a portion of expected route 1430 between location 1770 and destination 1780.

At any one or more times during travel along expected route 1430, wireless tracking device 1415 may activate its cellular communication circuit (e.g., high-power communications-interface 682" of FIG. 6C) and determine whether the cell tower identifiers 1815 with respective periods 1820 including a current time were received. When all expected cell tower identifiers 1815 are received, wireless tracking device 1415 determines progress of asset 1405 along expected route 1430 is normal.

When any one or more of the expected cell tower identifiers 1815 is received when unexpected, wireless tracking device 1415 determines progress of asset 1405 along expected route 1430 has deviated for the expected progress. In one example, when cell tower identifier 1440(1) is received at 10:10 AM (e.g., after its expected period 1820 of 9:30 AM-10:00 AM), wireless tracking device 1415 may determine that progress of asset 1405 is delayed. In another example, when cell tower identifier 1440(3) is received at 10:10 AM (e.g., before its expected period 1820 of 10:15 AM-10:45 AM), wireless tracking device 1415 may determine that progress of asset 1405 is ahead of schedule.

When any one or more of the expected cell tower identifiers 1815 is not received when unexpected, and/or when a received cell tower identifier is unknown, wireless tracking device 1415 may determine that asset 1405 has deviated from expected route 1430. For example, when wireless tracking device 1415 does not receive cell tower identifier 1440(2) in wireless signal 1435(2) between 9:58 AM and 10:23 AM, wireless tracking device 1415 may determine that asset 1405 is no longer following expected route 1430, such as when vehicle 1420 follows second route 1785. In this example, at location 1790, wireless tracking device 1415 may receive cell tower identifier 1440(4) in wireless signal 1435(4), and since cell tower identifier 1440(4) is not listed in tower time table 1810, wireless tracking device 1415 determines that asset 1405 has deviated from expected route 1430. Wireless tracking device 1415 may determine that expected route 1430 has resumed when one or more expected cell tower identifiers 1815 from tower time table 1810 are received. For example, when asset 1405 reaches location 1795 at 10:32 AM, wireless tracking device 1415 may receive cell tower identifier 1440(3) (e.g., "A012347") in wireless signal 1435(3), and thereby determine that expected route 1430 may have resumed. In certain embodiments, wireless tracking device 1415 may be configured to have a strict response for critical shipments, such as for high security and/or high sensitivity assets (e.g., defense assets, and/or vaccines, and so on). One example of a strict response is when any deviation (from path or sensed conditions) triggers alerts and activation of the cellular SIM card and data plan to allow the wireless tracking device 1415 to transmit alerts (e.g., SMS, phone call, internet data transmission) to a user client device or the server of the wireless tracking system. When wireless tracking device 1415 includes GPS circuitry, it may activate the GPS circuitry to determine its location at intervals. Wireless tracking device 115 may also issue instructions for redirection of the asset or the vehicle to a nearby client device (e.g., smartphone, tablet, etc.) of a user (e.g., driver, supervisor, etc.) via Bluetooth, where the client device may include certain software (e.g., an associate application, client application 722, etc.). Alternatively, wireless tracking device 115 may send instructions to the server of the wireless tracking system (e.g., as an email, SMS message, or a notification within the application). Where the vehicle (e.g., vehicle 1420) transporting the asset is self-driving, wireless tracking device 1415 may send a new route to the vehicle. One example of a lenient response is when wireless tracking device 1415 does not send notifications immediately, but instead waits for a certain period (e.g., one hour, 4 hours, six hours, etc.) before attempting to determine its location using any of the above ways, including using trilateration of received wireless signals 1435. When a subsequent attempt to determines its location fails or indicates an unexpected location (e.g., the asset has not returned to expected route 1430), wireless tracking device 1415 may escalate the response as described above.

Wireless tracking device 1415 may store received cell tower identifiers and corresponding RSSI values with a timestamp in its local memory and may send the stored information to the server. Accordingly, the server may determine the actual route of asset 1405 based on the RSSI value of the wireless signals, the cell tower identifier, and the timestamp.

In certain embodiments, tower time table 1810 may also include expected RSSI values (not shown) for each cell tower identifier 1815. In one example, tower time table 1810 defines an expected RSSI value range corresponding to period 1820. For example, based on a distance of expected route 1430 from each cell tower 1425, the server may determine an expected range of RSSI values that wireless tracking device 1415 should determine for the corresponding wireless signal 1435 over time. During operation, when an RSSI value for received wireless signal 1435(1) is not within an expected RSSI value range for that time, wireless tracking device 1415 may determine that asset 1405 has deviated from expected route 1430. For example, wireless tracking device 1415 may include a schedule of when to receive wireless signals 1435, and for each scheduled time, tower time table 1810 defines an expected RSSI value range. When at any scheduled time wireless tracking device 1415 does not receive the expected wireless signal 1435 with and RSSI within the expected range, wireless tracking device 1415 may determine that it has deviated from expected route 1430. Using the example of FIG. 17, when at location 1765, tower time table 1810 would define an expected RSSI value range for wireless signal 1435(2) based on a transmitted signal strength of cell tower 1425(2) and the distance between cell tower 1425(2) and location 1765.

Figure 19:
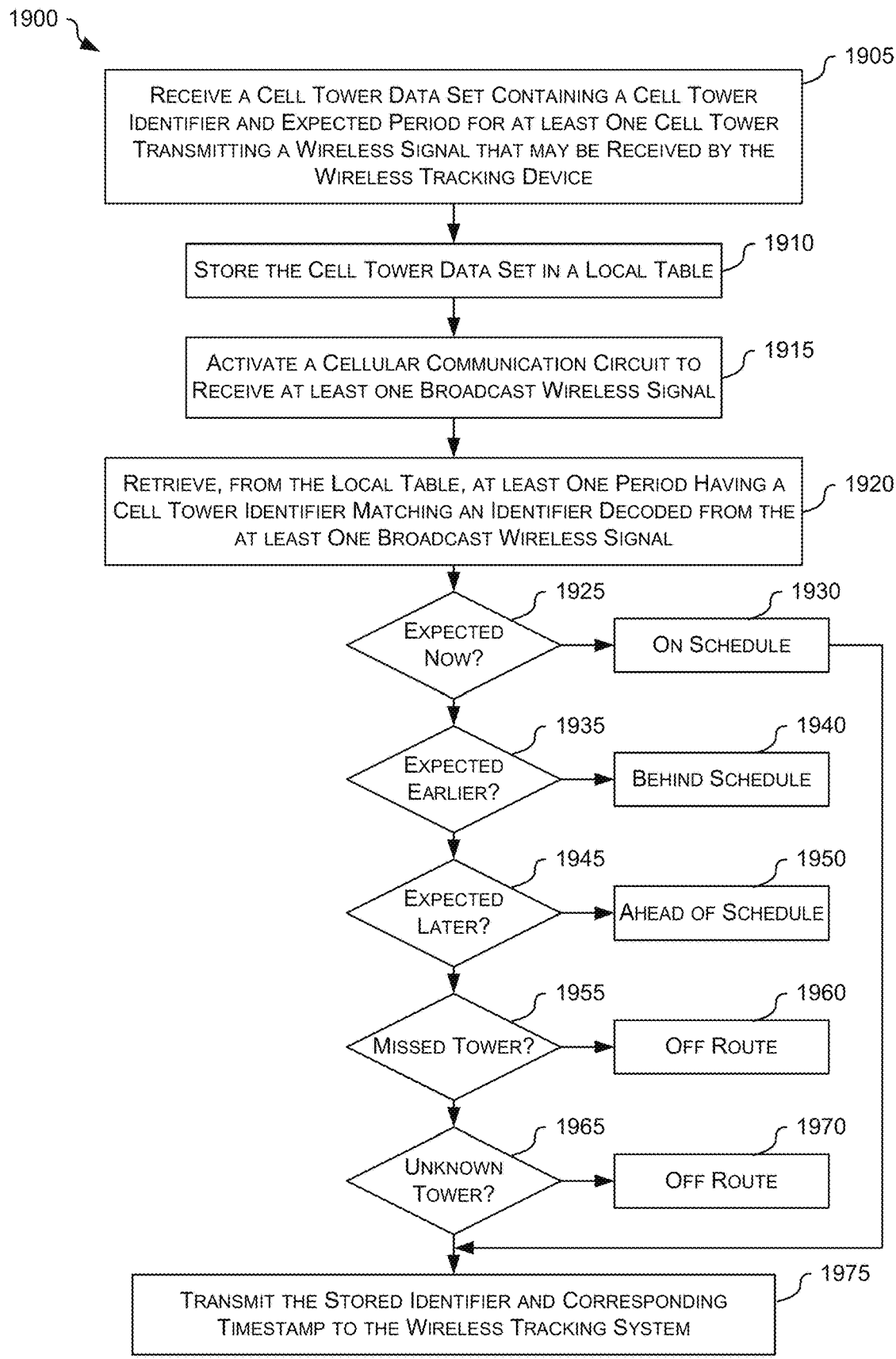
FIG. 19 is a flowchart showing one example method for using cell towers for locationing of assets, in embodiments.

FIG. 19 is a flowchart showing one example method 1900 for using cell towers for locationing of assets. Method 1900 is implemented in wireless tracking device 1415 of FIG. 14, for example. In block 1905, method 1900 receives a cell tower data set containing a cell tower identifier and an expected receive period for at least one cell tower transmitting a wireless signal that may be received by the wireless tracking device during the expected period. In one example of block 1905, wireless tracking device 1415 receives at least part of time tower time table 1810 (also called a cell tower data set) of FIG. 18 from server 1505. In block 1910, method 1900 stores the cell tower data set in a local table. In one example of block 1910, wireless tracking device 1415 stores at least part of time tower time table 1810 in local table 1450.

In block 1915, method 1900 activates a cellular communication circuit to receive at least one broadcast wireless signal. In one example of block 1915, wireless tracking device 1415 activates high-power communications-interface 682" of FIG. 6C to receive any of wireless signals 1435. In block 1920, method 1900 retrieves, from the local table, at least one period having a cell tower identifier matching an identifier decoded from the at least one broadcast wireless signal received in block 1915. In one example of block 1920, wireless tracking device 1415 retrieves period 1820 as "9:58 AM-10:23 AM" for received cell tower identifier "A012346."

Block 1925 is a decision. If, in block 1925, method 1900 determines that the retrieved period indicates that the corresponding cell tower identifier is expected now, method 1900 continues with block 1930; otherwise, method 1900 continues with block 1935. In block 1930, method 1900 determines that the asset is on the expected route and on schedule. Optionally, in block 1930, method 1900 may also store the received cell tower identifier, an optional RSSI value of the corresponding wireless signal 1435, and a timestamp in memory. Method then continues with block 1975.

Block 1935 is a decision. If, in block 1935, method 1900 determines that the retrieved period indicates that the corresponding cell tower identifier was expected earlier, method 1900 continues with block 1940; otherwise, method 1900 continues with block 1945. In block 1940, method 1900 determines that the asset is on the expected route but behind schedule. Method then continues with block 1975.

Block 1945 is a decision. If, in block 1945, method 1900 determines that the retrieved period indicates that the corresponding cell tower identifier was expected later, method 1900 continues with block 1950; otherwise, method 1900 continues with block 1955. In block 1950, method 1900 determines that the asset is on the expected route and is ahead of schedule. Method then continues with block 1975.

Block 1955 is a decision. If, in block 1955, method 1900 determines that a cell tower identifier was missed (e.g., not received during its corresponding period 1820, optionally including a tolerance), method 1900 continues with block 1960; otherwise, method 1900 continues with block 1965. In block 1960, method 1900 determines that the asset may be off the expected route. Method then continues with block 1975.

Block 1965 is a decision. If, in block 1965, method 1900 determines that a received cell tower identifier is unexpected (e.g., the received cell tower identifier is not within local table 1450), method 1900 continues with block 1970; otherwise, method 1900 continues with block 1975. In block 1970, method 1900 determines that the asset may be off the expected route. Method then continues with block 1975.

Optionally, in one or more of blocks 1930, 1940, 1950, 1960, and 1970, method 1900 stores received cell tower identifiers, RSSI values of corresponding wireless signals 1435, and timestamps in memory. That is, blocks 1905 through 1970 may repeat at intervals (e.g., periodically such as hourly, two-hourly, daily, etc., based on a schedule corresponding to expected route 1430, and based on detected events such as detected arrival at certain locations) to accumulate this information in memory.

In block 1975, method 1900 transmits the information stored in memory to the wireless tracking system. In one example of block 1975, wireless tracking device 1415 transmits the accumulated information to server 1505 when short-range/low-power communication with other nodes of the wireless tracking system is available, such as when asset 1405 arrives at any one or more of an inspection station, a transfer station, and its destination.

In certain embodiments, responsive to determining that transportation of asset 1405 is delayed, expedited, and/or has deviated from expected route 1430, wireless tracking device 1415 performs one or more actions. These actions include, for example, wireless tracking device 1415 activating one or more communication circuits and transmitting a notification to one or more of: an operator of the transportation, such as a truck driver or train conductor; an end user of the wireless tracking system; and/or an entity of the wireless tracking system. In another example, wireless tracking device 1415 activates one or more communication circuits and downloads another cell tower data set (e.g., one or more of a new or updated portion of database 1510, a next portion of database 1510 corresponding to a next geographic zone 1530 or a different geographic zone when wireless tracking device 1415 determines that asset 1405 has deviated from expected route 1430.

Figure 20:
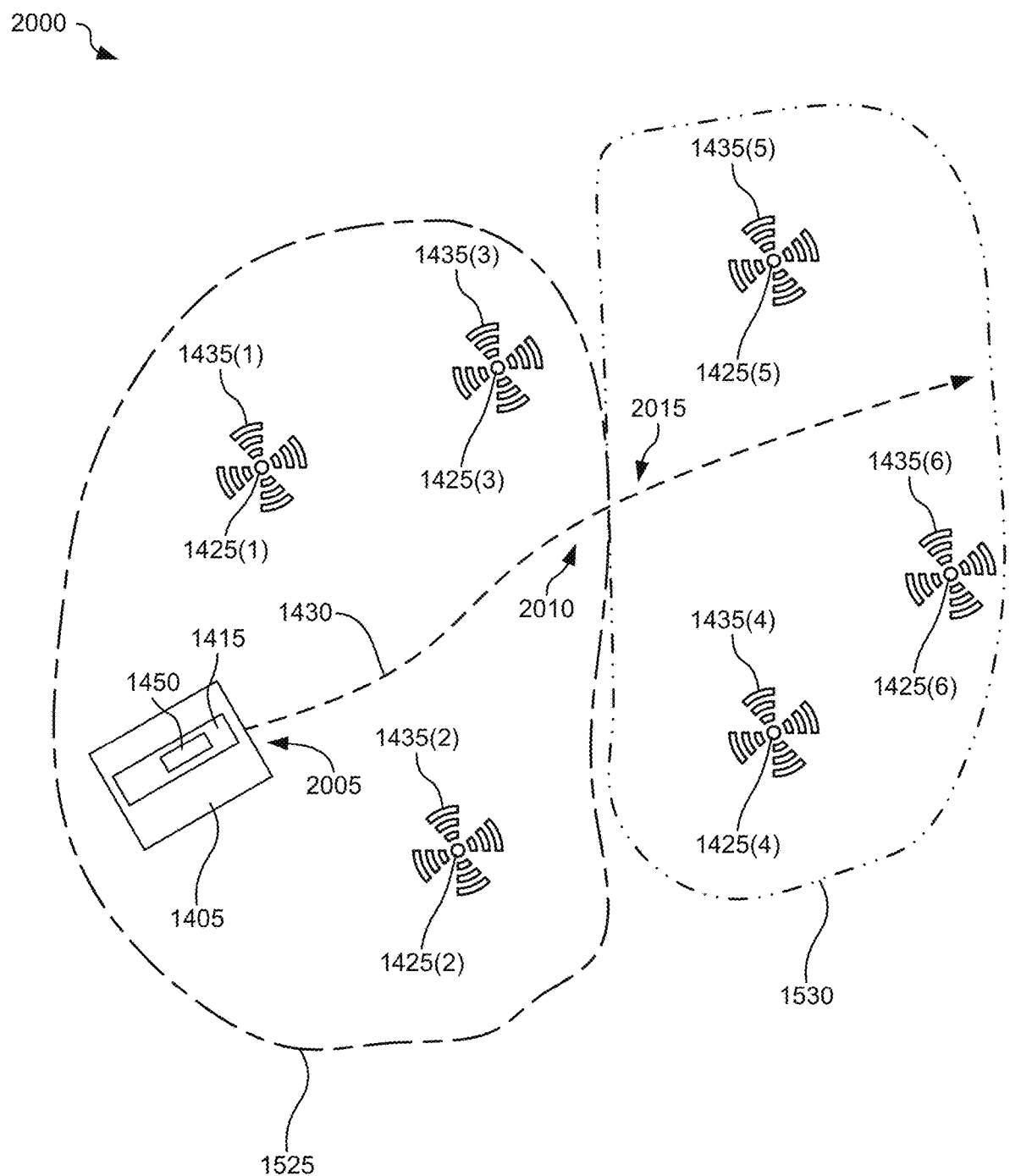
FIG. 20 is a map illustrating geographic zones corresponding to the expected route, in embodiments.

In other embodiments, wireless tracking device 1415 stores information describing encountered cell towers, such as each cell tower identifier, its respective RSSI, and a timestamp of when received. At a later time, wireless tracking device 1415 transmits the stored information to server 1505, cloud, or another entity of the wireless tracking system. For example, wireless tracking device 1415 transmit a batch of stored information, including information describing encountered cell towers, at a scheduled communication (e.g., every 8 hours, every day, etc.) to a cloud of the wireless tracking system. In another example, wireless tracking device 1415 transmits a batch of stored information, including information describing encountered cell towers, when arriving at an intermediate or end location, when an event (e.g., unloading) is detected, and/or when a short or medium-range communication connection to an entity of the wireless tracking system is available. Server 1505, cloud, or other entity of the wireless tracking system retrieves (e.g., from database 1510) geographic coordinates of the received cell tower identifiers and performs trilateration (or other locationing algorithm) on the geographic coordinates and respective RSSI values to determine a location estimate of wireless tracking device 1415 for one or more of the respective timestamps. Server 1505, cloud, or other entity may then send the location estimate to wireless tracking device 1415 and or another responsible entity during transportation of asset 1405. For example, server 1505 may send one or more notifications to an end user of the wireless tracking system to indicate progress of asset 1405, such as a notification indicating an estimated time of arrival of the asset, a notification indicating a delay to delivery of the assets, a notification indicating a deviation of the asset from the expected route 1430, and/or a notification indicating an unexpected event experienced by the asset, and so on. Continuing the example of FIGS. 14 and 15, FIG. 20 is a map 2000 illustrating geographic zones 1525 and 1530. Geographic zone 1525 includes cell towers 1425(1)-(3) and geographic zone 1530 includes cell towers 1425(4)-(6). Geographic zones 1525 and 1530 may each be of any size and include any number of cell towers 1425. In certain embodiments, boundaries of each geographic zone 1525 and 1530 each define a geofence. Wireless tracking device 1415 detects, based upon location estimate 1460, when it crosses, or is about to cross, from geographic zone 1525 to geographic zone 1530, and requests a next cell tower data set 1535' corresponding to geographic zone 1530 from the wireless tracking system. In one example, a geofence of geographic zone 1525 is triggered within wireless tracking device 1415 as location estimate 1460 approaches a boundary of geographic zone 1525, causing wireless tracking device 1415 to request cell tower data set 1535' for geographic zone 1530 from server 1505. In another example, where wireless tracking device 1415 sends stored cell tower identifiers and respective timestamps to server 1505, server 1505 determines when wireless tracking device 1415 approaches the boundary of geographic zone 1525 and sends cell tower data set 1535' for geographic zone 1530 to wireless tracking device 1415.

Figure 21:
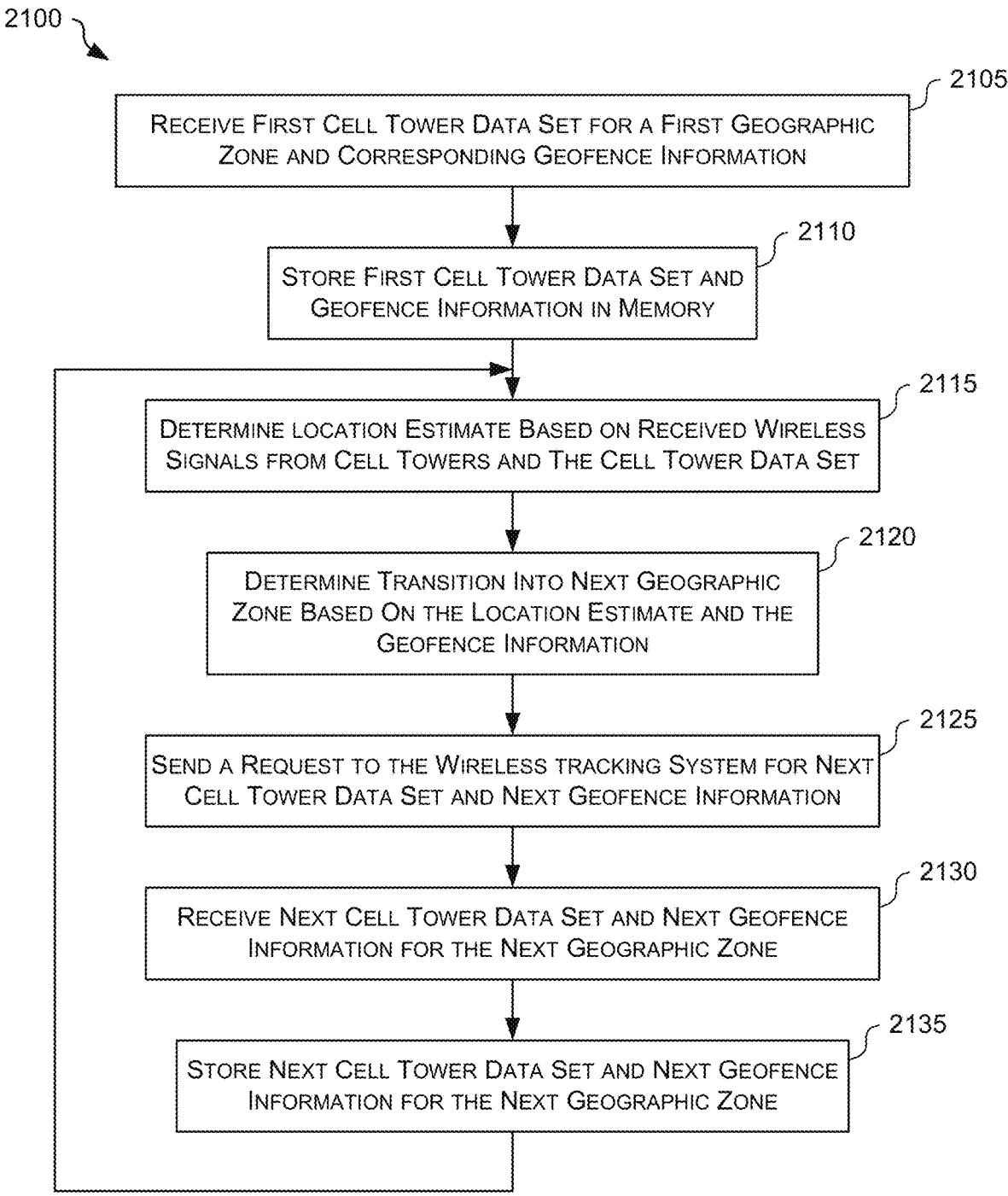
FIG. 21 is a flowchart illustrating one example method for receiving cell tower data sets during transport of an asset, in embodiments.

FIG. 21 is a flowchart illustrating one example method 2100 for receiving cell tower data sets during transport of an asset. Method 2100 is implemented within wireless tracking device 1415 for example. In the example of FIG. 20, asset 1405 and wireless tracking device 1415 start in geographic zone 1525.

In block 2105, method 2100 receives a first cell tower data set for a first geographic zone and corresponding geofence information. In one example of block 2105, wireless tracking device 1415 is at a starting location 2005 of expected route 1430 within geographic zone 1525 and receives cell tower data set 1535 and geofence information of geographic zone 1525 from server 1505 while it is being associated with (e.g., configured and attached to) asset 1405. Server 1505 also determines geofence information corresponding to geographic zone 1525 based on expected route 1430 and the locations of each cell tower 1425. Server 1505 includes geofence information with cell tower data set 1535 that is sent to wireless tracking device 1415. In block 2110, method 2100 stores the received cell tower data set and geofence information in memory. In one example of block 2110, wireless tracking device 1415 stores cell tower data set 1535 and corresponding geofence information in local table 1450. In embodiments, server 1505 compresses the data (as described above) before sending it to wireless tracking device 1415 to reduce transmission time and preserve power within the battery of wireless tracking device 1415.

In block 2115, method 2100 determines a location estimate based on received wireless signals from cell towers and the cell tower data set stored in memory. In one example of block 2115, wireless tracking device 1415 receives at least one wireless signal 1435 from at least one cell tower 1425, with respective RSSI values, and determines location estimate 1460 using cell tower data set stored in local table 1450. In block 2120, method 2100 determines transition into a next geographic zone based on the location estimate and the geofence information. In one example of block 2120, at location 2015 wireless tracking device 1415 determines it has crossed the boundary of geographic zone 1525 into geographic zone 1530. In another example of block 2120, at location 2010 wireless tracking device 1415 determines immanent crossing of the boundary of geographic zone 1525 into geographic zone 1530.

In block 2125, method 2100 sends a request to the wireless tracking system for the next cell tower data set and geofence information. In one example of block 2125, wireless tracking device 1415 sends a request to server 1505 for next cell tower data set 1535' and respective geofence information. In another example of block 2125, wireless tracking device 1415 sends a request to a local node (e.g., mobile gateways 710, 712 and/or stationary gateway 714 of network communications environment 700 of FIG. 7). In block 2130, method 2100 receives the next cell tower data set and the next geofence information for the next geographic zone. In one example of block 2130, wireless tracking device 1415 receives cell tower data set 1535' and corresponding geofence information from server 1505. In another example of block 2130, wireless tracking device 1415 receives cell tower data set 1535' and corresponding geofence information from the local node. In block 2135, method 2100 stores the next cell tower data set and next geofence information for the next geographic zone. In one example of block 2135, wireless tracking device 1415 stores cell tower data set 1535' and corresponding geofence information in local table 1450.

Blocks 2115 through 2135 repeat as wireless tracking device 1415 follows expected route 1430 and/or any deviations therefrom. Accordingly, during transportation of asset 1405, wireless tracking device 1415 determines when transitioning between geographic zones and requests relevant data for tracking asset 1405 in subsequent geographic zones. When asset 1405 reaches its destination (e.g., destination 1780), wireless tracking device 1415 may stop performing method 2100. Wireless tracking device 1415 may also stop performing method 2100 when other anomalous events occur during transportation, such as, for example, determining that it has a low battery life, entering hibernation mode, deviation of the transportation from an expected route, and the like.

In certain embodiments, one or more blocks of method 2100 are performed by another entity of the wireless tracking system, and method 2100 may have more, fewer, or different blocks than those described in FIG. 21.

Figure 22:
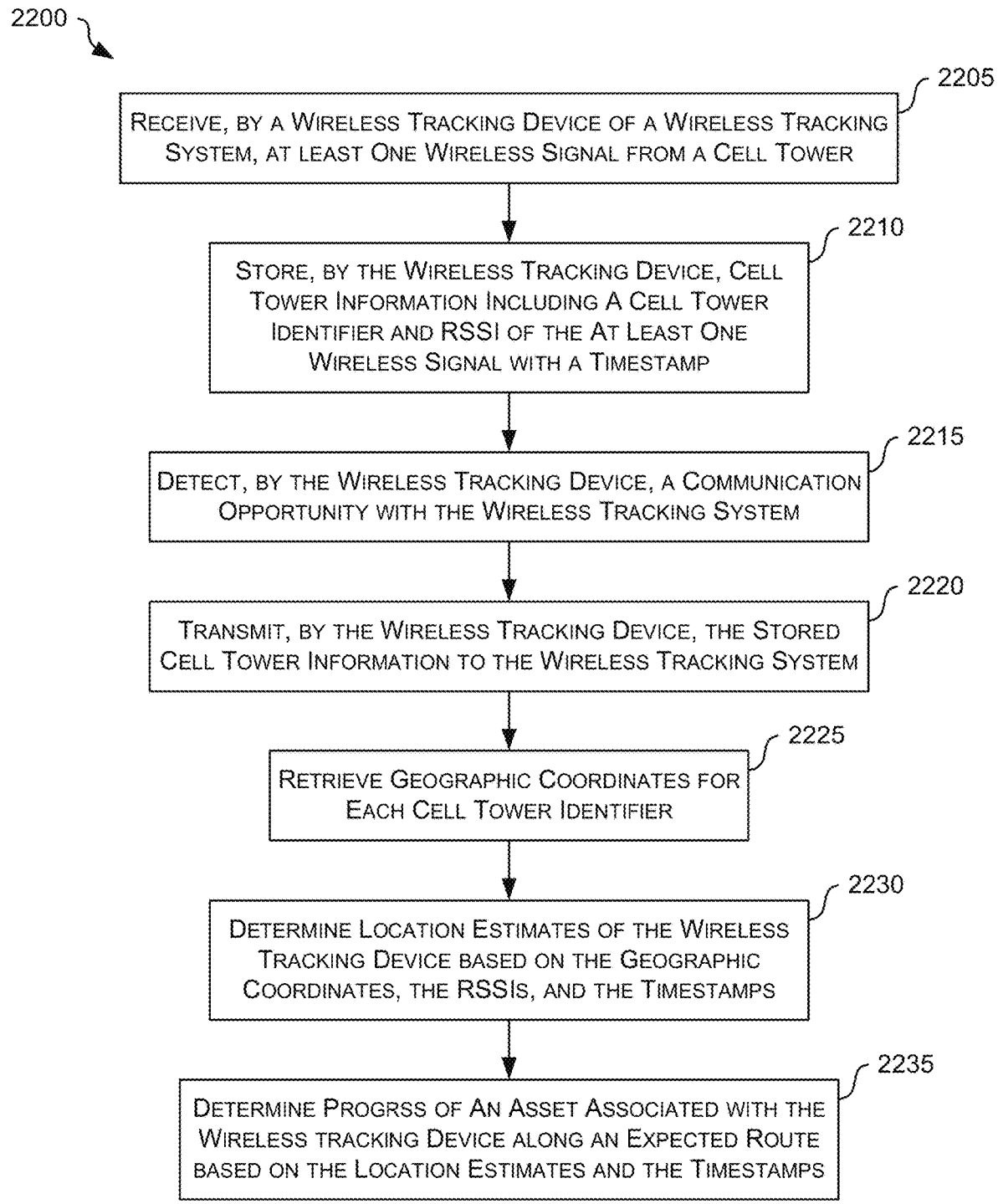
FIG. 22 is a flowchart illustrating one example method for using detected cell tower information to determine progress of an asset along an expected route, in embodiments.

FIG. 22 is a flowchart illustrating one example method 2200 for using detected cell tower information to determine progress of an asset along an expected route. Method 2200 is implemented in part by wireless tracking device 1415 of FIG. 14 and in part by another node (e.g., server 1505 of FIG. 15) of the wireless tracking system. For example, blocks 2205 through 2220 may be implemented by wireless tracking device 1415 and blocks 2225 through 2235 are implemented by server 1505 of FIG. 15.

In this embodiment, wireless tracking device 1415 does not estimate its location and therefore does not download the cell tower data set. Instead, wireless tracking device 1415 stores a cell tower identifier, respective RSSI, and a timestamp of when the wireless signal was received, in its memory. When a cost-effective communication path (e.g., using one of low-power communications-interface 652" or medium-power communication-interface 672" of FIG. 6C to conserve battery power as compared to using high-power communications-interface 682") to the wireless tracking system is detected, the wireless tracking device 1415 uploads the stored information to the wireless tracking system, such as to server 1505.

In block 2205, method 2200 activates its cellular communication circuit to receive at least one wireless signal from a cell tower. In one example of block 2205, wireless tracking device 1415 activates high-power communications-interface 682" to receive at least one wireless signal 1435 from cell towers 1425. In block 2210, method 2200 stores cell tower information including a cell tower identifier and RSSI of each of the at least one wireless signal with a timestamp indicative of when wireless signal 1435 was received. In one example of block 2210, wireless tracking device 1415 stores cell tower identifier 1440 received in wireless signal 1435, an RSSI of wireless signal 1435, and a timestamp in its memory. Blocks 2205 and 2210 repeat at intervals to detect and store cell tower information within its memory. For example, blocks 2205 and 2210 repeat with a periodicity of one hour. However, other periods may be used without departing from the scope hereof. In another example, blocks 2205 and 2210 repeat based on a schedule that may be coordinated with expected route 1430, where the schedule coincides with certain locations (e.g., transfer location, break location, inspection location, and so on) along the route.

In block 2215, method 2200 detects a communication opportunity with the wireless tracking system. In one example of block 2215, at intervals, wireless tracking device 1415 activates one or both of its low-power communications-interface 652" and medium-power communication-interface 672" to receive low-power or medium-power communication signals that indicate its proximity to other nodes of the wireless tracking system. In block 2220, method 2200 transmits the stored cell tower information to the wireless tracking system. In one example of block 2220, wireless tracking device 1415 transmits, using one its low-power communications-interface 652" or medium-power communication-interface 672", the cell tower information stored in block 2210 to server 1505 via a local node (e.g., one of mobile gateways 710, 712 and/or stationary gateway 714) of the wireless tracking system (e.g., network communications environment 700 of FIG. 7).

In block 2225, method 2200 retrieves geographic coordinates for each cell tower identifier in the received cell tower information. In one example of block 2225, server 1505 retrieves geographic coordinates 1520 corresponding to received cell tower identifiers 1515 from database 1510. In another example of block 2225, a local node of the wireless tracking system retrieves geographic coordinates corresponding to cell tower identifiers in the received cell tower information from at least part of database 1510 maintained by the local node. In block 2230, method 2200 determines location estimates of the wireless tracking device based on the geographic coordinates, the RSSIs, and the timestamps. In one example of block 2230, server 1505 (or the local node) uses a trilateration (or alternative) algorithm to determine location estimate 1460 for wireless tracking device 1415 from respective geographic coordinates and RSSI values for each group of wireless signals having a similar (e.g., within a few second tolerance) timestamp.

In block 2235, method 2200 determines progress of an asset associated with the wireless tracking device along an expected route based on the location estimates and the timestamps. In one example of block 2235, server 1505 (or the local node) determines progress of asset 1405 along expected route 1430 based on the determined location estimates 1460 and timestamps.

Figure 23:
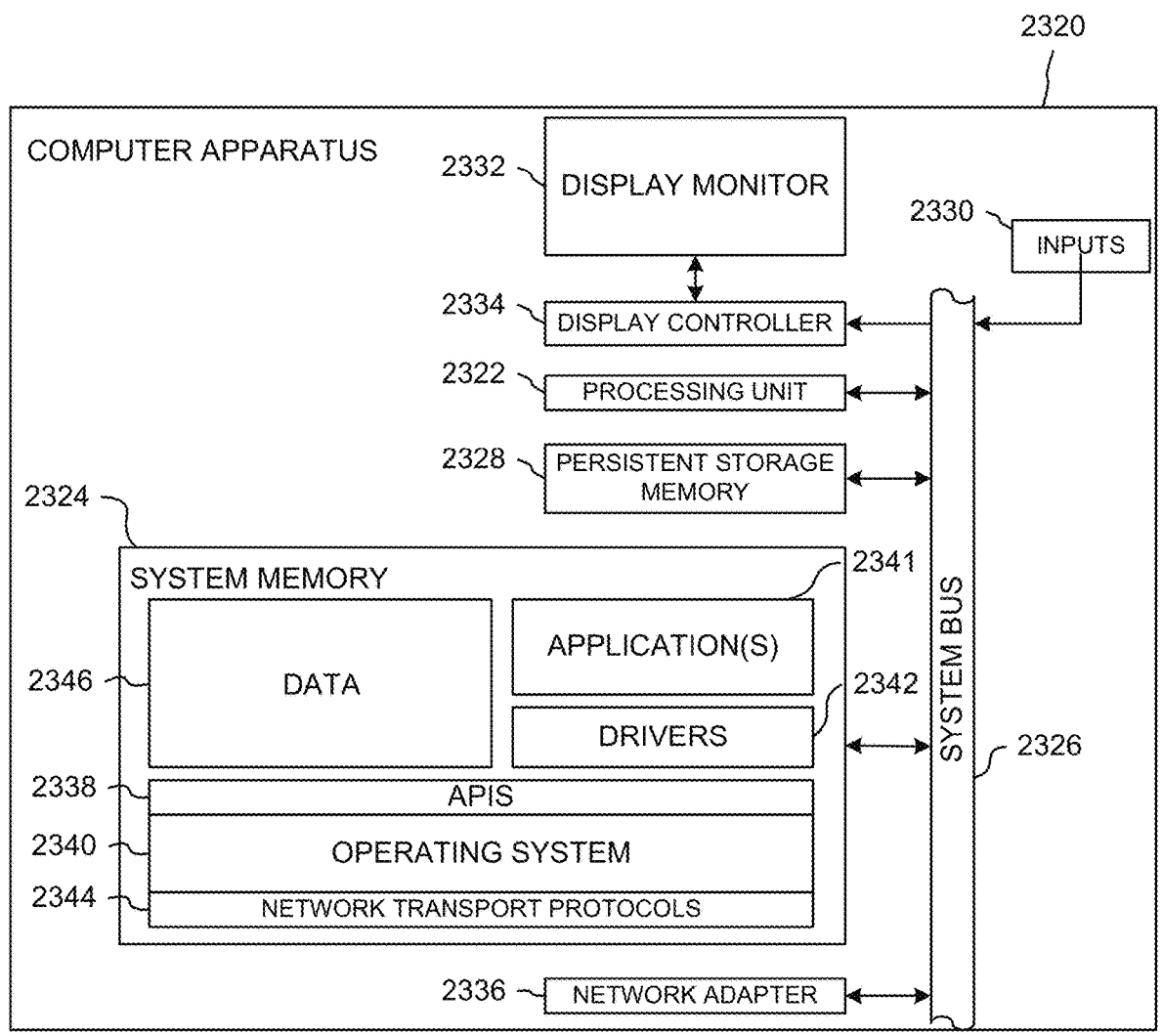
FIG. 23 shows one example computer apparatus that, either alone or in combination with one or more other computing apparatus, is operable to implement one or more of the computer systems described in this specification, in embodiments.

FIG. 23 shows an example embodiment of computer apparatus 2320 that, either alone or in combination with one or more other computing apparatus, is operable to implement one or more of the computer systems described in this specification. For example, computer apparatus 2320 may represent any of servers 704, FIG. 7, servers 804, FIG. 8, and server 1505, FIG. 15. The computer apparatus 2320 includes a processing unit 2322, a system memory 2324, and a system bus 2326 that couples the processing unit 2322 to the various components of the computer apparatus 2320. The processing unit 2322 may include one or more data processors, each of which may be in the form of any one of various commercially available computer processors. The system memory 2324 includes one or more computer-readable media that typically are associated with a software application addressing space that defines the addresses that are available to software applications. The system memory 2324 may include a read only memory (ROM) that stores a basic input/output system (BIOS) that contains start-up routines for the computer apparatus 2320, and a random-access memory (RAM). The system bus 2326 may be a memory bus, a peripheral bus, or a local bus, and may be compatible with any of a variety of bus protocols, including PCI, VESA, Microchannel, ISA, and EISA. The computer apparatus 2320 also includes a persistent storage memory 2328 (e.g., a hard drive, a floppy drive, a CD ROM drive, magnetic tape drives, flash memory devices, and digital video disks) that is connected to the system bus 2326 and contains one or more computer-readable media disks that provide non-volatile or persistent storage for data, data structures and computer-executable instructions.

A user may interact (e.g., input commands or data) with the computer apparatus 2320 using one or more input devices 2330 (e.g., one or more keyboards, computer mice, microphones, cameras, joysticks, physical motion sensors, and touch pads). Information may be presented through a graphical user interface (GUI) that is presented to the user on a display monitor 2332, which is controlled by a display controller 2334. The computer apparatus 2320 also may include other input/output hardware (e.g., peripheral output devices, such as speakers and a printer). The computer apparatus 2320 connects to other network nodes through a network adapter 2336 (also referred to as a "network interface card" or NIC).

A number of program modules may be stored in the system memory 2324, including application programming interfaces 2338 (APIs), an operating system (OS) 2340 (e.g., the Windows® operating system available from Microsoft Corporation of Redmond, Washington U.S.A.), software applications 2341 including one or more software applications programming the computer apparatus 2320 to perform one or more of the steps, tasks, operations, or processes of the positioning and/or tracking systems described herein, drivers 2342 (e.g., a GUI driver), network transport protocols 2344, and data 2346 (e.g., input data, output data, program data, a registry, and configuration settings).

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features

Features described above as well as those claimed below may be combined in various ways without departing from the scope hereof. The following enumerated examples illustrate some possible, non-limiting combinations:

(A1) A wireless tracking device for using cell towers for locationing of an asset includes: cellular communication circuit; a processor; a memory storing machine readable instructions that, when executed by the processor, cause the processor to: receive, from a server of a wireless tracking system, a cell tower data set having an entry with a cell tower identifier and cell tower location coordinates for each of at least one cell tower located along at least part of an expected route of the wireless tracking device; store the cell tower data set in the memory; activate the cellular communication circuit to receive at least one wireless signal including a broadcast cell tower identifier; retrieve cell tower location coordinates from an entry of the cell tower data set where the cell tower identifier matches the broadcast cell tower identifier; determine a location estimate of the wireless tracking device based on the retrieved cell tower coordinates; and storing the location estimate with a timestamp in the memory.

(B1) A method for using cell towers for locationing of an asset includes: receiving, within a wireless tracking device and from a server of a wireless tracking system, a cell tower data set having an entry with a cell tower identifier and cell tower location coordinates for each of at least one cell tower located along at least part of an expected route of the wireless tracking device; storing the cell tower data set in memory of the wireless tracking device; activating a cellular communication circuit to receive at least one wireless signal including a broadcast cell tower identifier; retrieving cell tower location coordinates from an entry of the cell tower data set where the cell tower identifier matches the broadcast cell tower identifier; determining a location estimate of the wireless tracking device based on the retrieved cell tower coordinates; and storing the location estimate with a timestamp in memory of the wireless tracking device.

(B2) In embodiments of (B1), the at least one cell tower being located along the expected route when a wireless signal broadcast from the cell tower is receivable on at least a portion of the expected route.

(B3) In either one of embodiments (B1) or (B2), the wireless tracking device is associated with the asset being transported over the expected route.

(B4) In any one of embodiments (B1)-(B3), and storing being repeated periodically.

(B5) In any one of embodiments (B1)-(B4), and storing being repeated according to a schedule associated with the expected route.

(B6) In any one of embodiments (B1)-(B5), the determining the location estimate comprising determining a circular region around the cell tower coordinates when a number of the at least one wireless signal is one.

(B7) Any one of embodiments (B1)-(B6) the method further including determining a received signal strength indication (RSSI) of the at least one broadcast wireless signal; and determining a radius of the circular region based on the RSSI.

(B8) In any one of embodiments (B1)-(B7), the method includes determining a received signal strength indication (RSSI) of each of the at least three wireless signals; and using trilateration to determine a current location based on at least three cell tower coordinates and respective RSSI.

(B9) Any one of embodiments (B1)-(B8) the method further including determining when the wireless tracking device has deviated from the expected route; and sending a notification of the deviation to the server.

(B10) In any one of embodiments (B1)-(B9), wherein the wireless tracking device has deviated from the expected route when the distance is greater than a deviation threshold.

(B11) In any one of embodiments (B1)-(B10), the determining when the wireless tracking device has deviated from the expected route comprising determining that at least one broadcast wireless signal receivable along the expected route is not received.
(B12) Any one of embodiments (B1)-(B11) the method further including determining when progress of the wireless tracking device along the expected route has deviated from expected progress based on the location estimate; and sending a notification of the deviation to the server.
(B13) In any one of embodiments (B1)-(B12), the method includes determining a time difference between the timestamp and an expected time for a corresponding location along the expected route is greater than a time threshold, wherein the notification indicates the time difference.
(B14) Any one of embodiments (B1)-(B13) the method further including transmitting the stored location estimates and respective timestamps to the server at intervals.
(B15) In any one of embodiments (B1)-(B14), the intervals comprising a schedule corresponding to locations and or times along the expected route.
(B16) In any one of embodiments (B1)-(B15), the transmitting occurring when the wireless tracking device is within short-range communication range of other nodes of the wireless tracking system.
(B17) Any one of embodiments (B1)-(B16) the method further including receiving an update to the cell tower data set based on deviation of the location estimates from the expected route.
(B18) Any one of embodiments (B1)-(B17) the method further including receiving an update to the cell tower data set based on the location estimates and a next part of the expected route.
(C1) A method for using cell towers for locationing of assets includes: receiving, within a wireless tracking device and from a server of a wireless tracking system, a cell tower data set having an entry with a cell tower identifier and a period for each of at least one cell tower located along an expected route of the wireless tracking device; storing the cell tower data set in memory of the wireless tracking device; activating a cellular communication circuit to receive at least one wireless signal including a broadcast cell tower identifier; determining at least one cell tower identifier of the cell tower data set having a period that includes a current time; and determining progress along the expected route based on the at least one cell tower identifier matching the broadcast cell tower identifier of the at least one wireless signal.
(C2) The embodiment (C1) the method further including storing the broadcast cell tower identifier with a timestamp in memory of the wireless tracking device.
(C3) Either one of embodiments (C1) or (C2) the method further including transmitting the cell tower identifier and the timestamp to the server.
(C4) Any one of embodiments (C1)-(C3) the method further including determining that the progress is ahead of schedule when the broadcast cell tower identifier matches an entry of the cell tower data set with an earlier period.
(C5) Any one of embodiments (C1)-(C4) the method further including determining that the progress is behind schedule when the broadcast cell tower identifier matches an entry of the cell tower data set with a later period.
(C6) Any one of embodiments (C1)-(C5) the method further including determining that the wireless tracking device is deviating from the expected route when, for a period of the cell tower data set that includes the current time, the broadcast cell tower identifier of any of the at least one wireless signal does not match the cell tower identifier.
(D1) A method for using cell towers for locationing of assets includes: determining, within a server of a wireless tracking system, an expected route for a wireless tracking device associated with an asset being transported; determining, for at least a portion of the expected route, at least one cell tower having a wireless signal that may be received by the wireless tracking tag during the portion of the expected route; generating a cell tower data set containing, for each of the at least one cell tower, a cell tower identifier and cell tower location; and sending the cell tower data set to the wireless tracking device.
(D2) In embodiments of (D1), the cell tower location comprises geographic coordinates defining the cell tower location.
(D3) In either one of embodiments (D1) or (D2), the expected route comprises a plurality of geographic coordinates and, for each of the plurality of geographic coordinates, a period when the wireless tracking device is expected at the geographic coordinates.
(D4) Any one of embodiments (D1)-(D3) the method further including receiving, at intervals from the wireless tracking device, at least one location estimate and respective timestamp; determining, for a next portion of the expected route based on the at least one location estimate, at least one next cell tower having a wireless signal that may be received by the wireless tracking tag during the next portion of the expected route; generating a next cell tower data set containing, for each of the at least one next cell tower, a next cell tower identifier and next cell tower location; and sending the next cell tower data set to the wireless tracking device.
(E1) A system for tracking a location of an asset includes: a wireless tracking device associated with the asset comprising a cellular communication system for performing cellular communications; a cellular communication network comprising a plurality of cell towers, the cellular communication network operated by a cell network provider; a server configured to track the location of the asset based on wireless communications performed between the wireless tracking device and other wireless nodes of the system; a database storing identifiers and locations of the plurality of cell towers, wherein the wireless tracking device stores a first subset of the database corresponding to a first subset of the plurality of cell towers, and the wireless tracking device is configured to activate the cellular communication system to receive at least one wireless signal including a broadcast cell tower identifier from one of the subset of the plurality of cell tower, retrieving cell tower location coordinates from an entry of the subset of the database corresponding to the identifier, and determining a location estimate of the wireless tracking device based on the retrieved cell tower coordinates.

What is claimed is:
1. A wireless tracking device for using cell towers for locationing of an asset, comprising:
cellular communication circuit;
a processor;
a memory storing machine readable instructions that, when executed by the processor, cause the processor to:

receive, from a server of a wireless tracking system, a cell tower data set having an entry with a cell tower identifier and cell tower location coordinates for each of at least one cell tower located along at least part of an expected route of the wireless tracking device;

store the cell tower data set in the memory;

activate the cellular communication circuit to receive at least one wireless signal including a broadcast cell tower identifier;

retrieve a first set of cell tower location coordinates from an entry of the cell tower data set where the cell tower identifier matches the broadcast cell tower identifier;

determine a location estimate of the wireless tracking device based on the retrieved first set of cell tower location coordinates; and storing the location estimate with a timestamp in the memory.

2. A method for using cell towers for locationing of an asset, comprising:

receiving, within a wireless tracking device and from a server of a wireless tracking system, a cell tower data set having an entry with a cell tower identifier and cell tower location coordinates for each of at least one cell tower located along at least part of an expected route of the wireless tracking device;

storing the cell tower data set in memory of the wireless tracking device;

activating a cellular communication circuit to receive at least one wireless signal including a broadcast cell tower identifier;

retrieving a first set of cell tower location coordinates from an entry of the cell tower data set where the cell tower identifier matches the broadcast cell tower identifier;

determining a location estimate of the wireless tracking device based on the retrieved first set of cell tower location coordinates; and storing the location estimate with a timestamp in memory of the wireless tracking device.

3. The method of claim 2, the at least one cell tower being located along the expected route when a wireless signal broadcast from the cell tower is receivable on at least a portion of the expected route.

4. The method of claim 2, wherein the wireless tracking device is associated with the asset being transported over the expected route.

5. The method of claim 2, the activating, retrieving, determining, and storing being repeated periodically.

6. The method of claim 2, the activating, retrieving, determining, and storing being repeated according to a schedule associated with the expected route.

7. The method of claim 2, the determining the location estimate comprising determining a circular region around a first cell tower location corresponding to the first set of cell tower location coordinates, when a number of the at least one wireless signal is one.

8. The method of claim 7, further comprising;

determining a received signal strength indication (RSSI) of the at least one broadcast wireless signal; and determining a radius of the circular region based on the RSSI.

9. The method of claim 2, when a number of the at least one wireless signal is at least three, the determining the location estimate comprising:

determining a received signal strength indication (RSSI) of each of the at least three wireless signals; and using trilateration to determine a current location based on at least three cell tower location coordinates and respective RSSI.

10. The method of claim 2, further comprising:

determining when the wireless tracking device has deviated from the expected route; and sending a notification of the deviation to the server.

11. The method of claim 10, the determining when the wireless tracking device has deviated from the expected route comprising determining a distance between the location estimate and a corresponding location on the expected route, wherein the wireless tracking device has deviated from the expected route when the distance is greater than a deviation threshold.

12. The method of claim 10, the determining when the wireless tracking device has deviated from the expected route comprising determining that at least one broadcast wireless signal receivable along the expected route is not received.

13. The method of claim 2, further comprising:

determining when progress of the wireless tracking device along the expected route has deviated from expected progress based on the location estimate; and sending a notification of the deviation to the server.

14. The method of claim 10, the determining when progress of the wireless tracking device along the expected route has deviated comprising:

determining a time difference between the timestamp and an expected time for a corresponding location along the expected route is greater than a time threshold, wherein the notification indicates the time difference.

15. The method of claim 2, further comprising transmitting the stored location estimates and respective timestamps to the server at intervals.

16. The method of claim 15, the intervals comprising a schedule corresponding to locations and or times along the expected route.

17. The method of claim 15, the transmitting occurring when the wireless tracking device is within short-range communication range of other nodes of the wireless tracking system.

18. The method of claim 2, further comprising receiving an update to the cell tower data set based on deviation of the location estimates from the expected route.

19. The method of claim 2, further comprising receiving an update to the cell tower data set based on the location estimates and a next part of the expected route.

20. A method for using cell towers for locationing of assets, comprising:

receiving, within a wireless tracking device and from a server of a wireless tracking system, a cell tower data set having an entry with a cell tower identifier and a period for each of at least one cell tower located along an expected route of the wireless tracking device;

storing the cell tower data set in memory of the wireless tracking device;

activating a cellular communication circuit to receive at least one wireless signal including a broadcast cell tower identifier;

determining at least one cell tower identifier of the cell tower data set having a period that includes a current time; and determining progress of an asset associated with the wireless tracking device along the expected route based on the at least one cell tower identifier matching the broadcast cell tower identifier of the at least one wireless signal.

21. The method of claim 20, further comprising storing the broadcast cell tower identifier with a timestamp in memory of the wireless tracking device.

22. The method of claim 21, further comprising transmitting the cell tower identifier and the timestamp to the server.

23. The method of claim 20, further comprising determining that the progress of the asset is ahead of schedule when the broadcast cell tower identifier matches an entry of the cell tower data set with an earlier period.

24. The method of claim 20, further comprising determining that the progress of the asset is behind schedule when the broadcast cell tower identifier matches an entry of the cell tower data set with a later period.

25. The method of claim 20, further comprising determining that the wireless tracking device is deviating from the expected route when, for a period of the cell tower data set that includes the current time, the broadcast cell tower identifier of any of the at least one wireless signal does not match the cell tower identifier.

* * * * *